(12) United States Patent
Inoue et al.

(10) Patent No.: US 9,195,156 B2
(45) Date of Patent: Nov. 24, 2015

(54) PARTICULATE MATERIAL PRODUCTION METHOD, AND PARTICULATE MATERIAL PRODUCTION APPARATUS

(71) Applicants: Ryota Inoue, Shizuoka (JP); Yoshihiro Moriya, Shizuoka (JP); Hiroshi Yamada, Shizuoka (JP); Tatsuru Moritani, Shizuoka (JP); Minoru Masuda, Shizuoka (JP); Akinori Saito, Shizuoka (JP); Yasutada Shitara, Shizuoka (JP); Kiyotada Katoh, Shizuoka (JP); Satoshi Takahashi, Kanagawa (JP)

(72) Inventors: Ryota Inoue, Shizuoka (JP); Yoshihiro Moriya, Shizuoka (JP); Hiroshi Yamada, Shizuoka (JP); Tatsuru Moritani, Shizuoka (JP); Minoru Masuda, Shizuoka (JP); Akinori Saito, Shizuoka (JP); Yasutada Shitara, Shizuoka (JP); Kiyotada Katoh, Shizuoka (JP); Satoshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 184 days.

(21) Appl. No.: 14/143,601

(22) Filed: Dec. 30, 2013

(65) Prior Publication Data
US 2014/0242514 A1 Aug. 28, 2014

(30) Foreign Application Priority Data

Feb. 25, 2013 (JP) .................................. 2013-034211

(51) Int. Cl.
*B01J 2/04* (2006.01)
*B01J 2/18* (2006.01)
*G03G 9/08* (2006.01)
*G03G 9/087* (2006.01)
*G03G 9/09* (2006.01)

(52) U.S. Cl.
CPC ................. *G03G 9/0804* (2013.01); *B01J 2/04* (2013.01); *B01J 2/18* (2013.01); *G03G 9/0802* (2013.01); *G03G 9/0806* (2013.01); *G03G 9/0817* (2013.01); *G03G 9/08755* (2013.01); *G03G 9/08795* (2013.01); *G03G 9/08797* (2013.01); *G03G 9/0904* (2013.01)

(58) Field of Classification Search
None
See application file for complete search history.

(56) References Cited

U.S. PATENT DOCUMENTS

| 5,972,507 A * | 10/1999 | Morimoto ............... C08B 16/00 264/8 |
| 6,869,551 B2 * | 3/2005 | Lee ......................... A61K 9/122 264/5 |
| 7,404,828 B1 * | 7/2008 | Nicola .................. B01D 9/0027 23/297 |
| 8,568,628 B2 * | 10/2013 | Norikane .................... B01J 2/04 264/13 |
| 2006/0165989 A1 * | 7/2006 | Takikawa .................... B01J 2/06 428/402.2 |
| 2006/0210909 A1 | 9/2006 | Ohtani |
| 2007/0102836 A1 * | 5/2007 | Mishima .................... B01J 2/04 264/13 |
| 2009/0035579 A1 * | 2/2009 | Coufal ................... B01D 53/90 428/403 |

(Continued)

FOREIGN PATENT DOCUMENTS

| JP | 2006-293320 | 10/2006 |
| JP | 2011-078878 | 4/2011 |
| JP | 2011-212668 | 10/2011 |

*Primary Examiner* — Mary F Theisen
(74) *Attorney, Agent, or Firm* — Oblon, McClelland, Maier & Neustadt, L.L.P.

(57) ABSTRACT

A particulate material production method is provided. The particulate material production method includes ejecting a particulate material composition liquid, which includes an organic solvent and a particulate material composition including at least a resin and dissolved or dispersed in the organic solvent, from at least one nozzle to form droplets of the particulate material composition liquid in a gas phase; and solidifying the droplets of the particulate material composition liquid to prepare particles of the particulate material composition. The droplet solidifying step includes contacting the droplets with a poor solvent for the particulate material composition.

10 Claims, 12 Drawing Sheets

(56) References Cited

U.S. PATENT DOCUMENTS

| | | | |
|---|---|---|---|
| 2010/0021209 A1* | 1/2010 | Watanabe | G03G 9/0804 399/252 |
| 2011/0014565 A1 | 1/2011 | Norikane et al. | |
| 2011/0305987 A1 | 12/2011 | Yohichiroh et al. | |
| 2012/0070777 A1 | 3/2012 | Makabe et al. | |
| 2012/0264049 A1 | 10/2012 | Masuda et al. | |
| 2012/0270147 A1 | 10/2012 | Katoh et al. | |
| 2013/0010035 A1 | 1/2013 | Norikane et al. | |
| 2013/0034810 A1 | 2/2013 | Norikane et al. | |
| 2013/0273188 A1 | 10/2013 | Takahashi et al. | |

* cited by examiner

| BASIC PARTICLE | UNITED TWO PARTICLES | UNITED THREE PARTICLES | UNITED FOUR PARTICLES |
| --- | --- | --- | --- |
| (4.2 [μm]) | (5.3 [μm]) | (6.1 [μm]) | (6.7 [μm]) |

BASIC PARTICLE     AGGREGATED TWO PARTICLES     AGGREGATED THREE PARTICLES

US 9,195,156 B2

PARTICULATE MATERIAL PRODUCTION METHOD, AND PARTICULATE MATERIAL PRODUCTION APPARATUS

CROSS-REFERENCE TO RELATED APPLICATIONS

This patent application is based on and claims priority pursuant to 35 U.S.C. §119 to Japanese Patent Application No. 2013-034211 filed on Feb. 25, 2013 in the Japan Patent Office, the entire disclosure of which is hereby incorporated by reference herein.

TECHNICAL FIELD

This disclosure relates to a particulate material production method, and a particulate material production apparatus.

BACKGROUND

Only pulverization methods have been conventionally used for producing toner for use in developing an electrostatic image in electrophotographic image forming apparatus such as copiers, printers, facsimiles and multi-functional products having two or more of copying, printing and facsimileing functions. However, recently polymerization methods in which toner particles are formed in an aqueous medium are used more broadly than pulverization methods. The toner produced by a polymerization method is called a polymerized toner or a chemical toner.

The derivation of the name "polymerized toner" is that when toner particles are prepared, a polymerization reaction of toner raw materials is performed. Recently, various polymerization methods are practically used, and specific examples thereof include suspension polymerization methods, emulsion polymerization methods, polymer suspension methods (polymer aggregation methods), and ester elongation reaction methods.

Since polymerization methods have advantages over pulverization methods such that relatively small toner particles can be produced; the particle diameter distribution is relatively narrow; and high quality images can be produced when polymerized toner is used for electrophotography because the particle shape is close to sphere. However, all toner particles are produced at the same time, it is hard to prepare toner particles having a sharper particle diameter distribution (such as toner particles having substantially the same particle diameter).

In attempting to produce toner particles having a sharper particle diameter distribution, JP-2006-293320-A discloses a toner production method using a liquid ejection/granulation method.

The present inventors recognize that a need exists for a toner production method by which toner particles having a sharper particle diameter distribution can be produced in a relatively short time (i.e., at low costs) with hardly forming united and aggregated particles using an apparatus with a small drying area.

SUMMARY

As an aspect of this disclosure, a particulate material production method is provided which includes ejecting a particulate material composition liquid, which includes an organic solvent and a particulate material composition including at least a resin and dissolved or dispersed in the organic solvent, from at least one nozzle to form droplets of the particulate material composition liquid in a gas phase; and solidifying the droplets of the particulate material composition liquid to prepare particles of the particulate material composition. The solidifying process includes contacting the droplets with a poor solvent for the particulate material composition.

As another aspect of this disclosure, a particulate material production apparatus is provided which includes a droplet ejector to eject a particulate material composition liquid, which includes an organic solvent and a particulate material composition including at least a resin and dissolved or dispersed in the organic solvent, from at least one nozzle to form droplets of the particulate material composition liquid in a gas phase; and a poor solvent contacting device to contact the droplets with a poor solvent for the particulate material composition.

The aforementioned and other aspects, features and advantages will become apparent upon consideration of the following description of the preferred embodiments taken in conjunction with the accompanying drawings.

DETAILED DESCRIPTION

Figure 1:
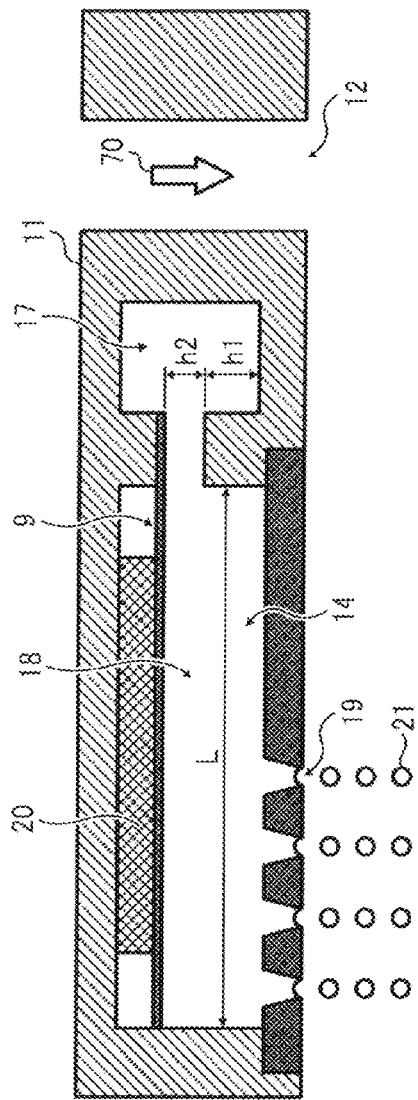
FIG. 1 is a schematic cross-sectional view illustrating a liquid column resonance type droplet ejecting device for use in a particulate material production apparatus according to an embodiment.

The object of this disclosure is to provide a particulate material production method which uses a liquid ejection/granulation method and by which particles can be produced while hardly forming united (aggregated) particles and satisfactorily removing a residual solvent from the particles.

The present inventors discover that when drying and solidifying droplets of a particulate material composition liquid ejected by a liquid ejection/granulation method, the above-mentioned object can be attained by contacting the droplets with a poor solvent for the particulate material composition in the drying and solidifying process.

Initially, the particulate material production method and apparatus of this disclosure will be described by reference to drawings.

In this application, a mixture including constituents of a targeted particulate material is referred to as a particulate material composition. The particulate material composition includes at least a resin. In addition, a liquid to be ejected as droplets, in which the constituents of the particulate material composition are dissolved or dispersed in a solvent, is referred to as a particulate material composition liquid.

In the particulate material production method and apparatus of this disclosure, a liquid including the particulate material composition (i.e., the particulate material composition liquid) is ejected by a droplet ejecting device to form droplets of the liquid, and the droplets are solidified to prepare particles of the particulate material composition.

Hereinafter, a toner production apparatus, which is an example of the particulate material production apparatus of this disclosure, will be described by reference to FIGS. 1-10. The toner production apparatus includes at least a droplet ejecting device and a droplet solidifying and collecting device (hereinafter referred to as a droplet solidifying device).

Initially, the droplet ejecting device will be described.

The droplet ejecting device is not particularly limited, and any known droplet ejecting devices can be used as long as the devices can eject droplets having a relatively narrow particle diameter distribution. Specific examples of such droplet ejecting devices include one-fluid nozzle type ejecting devices, two-fluid nozzle type ejecting devices, membrane oscillation type ejecting devices, Rayleigh fission type ejecting devices, and liquid vibration type ejecting devices, and liquid column resonance devices. Specific examples of the membrane oscillation type ejecting devices include ejecting devices disclosed in JP-2008-292976-A (corresponding to US20090317735 incorporated herein by reference). Specific examples of the Rayleigh fission type ejecting devices include the ejecting devices disclosed in JP-2007-199463-A or US20060210909 incorporated herein by reference. Specific examples of the liquid vibration type ejecting device include the ejecting devices disclosed in JP-2010-102195-A (corresponding to US20100104970 incorporated herein by reference).

Liquid column resonance methods have advantages such that ejected droplets have relatively narrow particle diameter distribution; and the methods have good particle productivity. In the liquid column resonance methods, vibration is applied to a liquid in a liquid column resonance chamber, in which multiple ejection nozzles are formed to enhance the productivity of the product (i.e., toner in this case), to form a liquid column resonance standing wave, so that the liquid is ejected from nozzles located in a region in which the standing wave has an antinode, thereby forming droplets of the liquid.

It is preferable to use one of the above-mentioned droplet ejecting devices for the droplet ejecting device of the particulate material production apparatus of this disclosure.

Next, the liquid column resonance type droplet ejecting device will be described.

FIG. 1 illustrates a liquid column resonance type droplet ejecting device. As illustrated in FIG. 1, a droplet ejecting device 11 includes a common liquid passage 17 and a liquid column resonance chamber 18. The liquid column resonance chamber 18 is communicated with the common liquid passage 17, which is provided on one of walls of the liquid column resonance chamber located at the ends thereof in the longitudinal direction thereof. The liquid column resonance chamber 18 has another wall connected with the longitudinal end walls and having droplet ejection nozzles 19 to eject droplets 21 of a particulate composition liquid, and a vibration generating device 20, which is provided on another wall facing the ejection nozzles 19 and which generates high-frequency vibration to form a liquid column resonance standing wave in the liquid column resonance chamber 18. The vibration generating device 20 is connected with a high-frequency power source.

A particulate material composition liquid 14 (hereinafter sometimes referred to as a toner composition liquid) is fed into the common liquid passage 17 of a liquid column resonance droplet forming unit 10 (illustrated in FIG. 2) by a circulating pump 15 (illustrated in FIG. 9) through a liquid supply passage so that the toner composition liquid 14 is supplied to the liquid column resonance chamber 18. In the liquid column resonance chamber 18 in which the toner composition liquid 14 is contained, pressure distribution is formed due to the liquid column resonance standing wave generated by the vibration generating device 20, and the droplets 21 are ejected from the ejection nozzles 19, which are arranged in a region in which the standing wave has an antinode and in which the liquid column resonance standing wave has a large amplitude, and pressure largely fluctuates.

In this application, the region in which the liquid column resonance standing wave has an antinode means a region of the standing wave other than a wave node of the standing wave. It is preferable that at the region the standing wave has a large amplitude (i.e., a large pressure fluctuation) sufficient to eject droplets, and it is more preferable that the region is present in a region (hereinafter sometimes referred to as an antinode region) whose center is the maximum amplitude point of the pressure standing wave (i.e., the wave node of the velocity standing wave) and which has a length of ±¼ of the wavelength of the standing wave. When the multiple droplet ejection nozzles 19 are present in the antinode region, droplets ejected from the nozzles have substantially the same particle size even when the multiple nozzles are opened. In addition, since multiple nozzles can be used, droplets can be efficiently produced and a nozzle clogging problem in that the nozzles are clogged with the particulate material composition liquid is hardly caused. The particulate composition liquid 14 passing through the common liquid passage 17 is returned to a raw material container 13 (illustrated in FIG. 9) through a liquid return tube (not shown).

When the amount of the particulate material composition liquid 14 in the liquid column resonance chamber 18 is decreased due to ejection of the droplets 21 of the particulate material composition liquid 14 from the nozzles 19, the force of sucking the particulate material composition liquid is increased by the action of the liquid column resonance standing wave in the liquid column resonance chamber 18, thereby increasing the amount of the particulate material composition liquid 14 supplied to the liquid column resonance chamber 18 from the common liquid passage 17. Therefore, the liquid column resonance chamber 18 is replenished with the particulate material composition liquid 14. When the liquid column resonance chamber 18 is replenished with the particulate material composition liquid 14, the flow rate of the particulate material composition liquid 14 flowing through the common liquid passage 17 returns to the normal flow rate.

Figure 2:
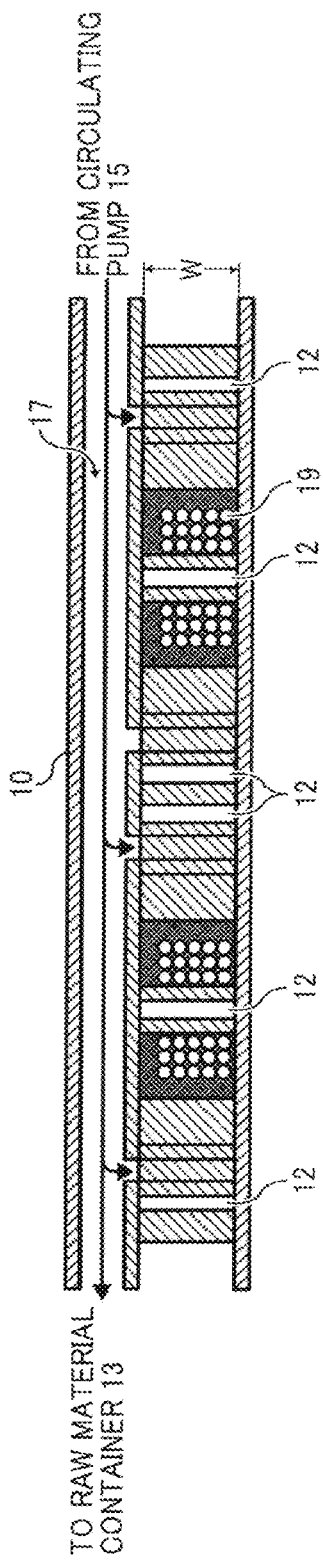
FIG. 2 is a schematic view illustrating a liquid column resonance type droplet ejecting unit for use in the particulate material production apparatus when the unit is observed from the droplet ejection surface side thereof.

The liquid column resonance chamber 18 of the liquid column resonance droplet ejecting device 11 is preferably constituted of frames, which are connected with each other and which are made of a material having a high rigidity (such as metals, ceramics and silicon) such that the resonance frequency of the particulate material composition liquid 14 in the liquid column resonance chamber 18 is not affected by the frames. In addition, as illustrated in FIG. 1, a length L between two opposed longitudinal end walls of the liquid column resonance chamber 18 is determined based on the liquid column resonance principle mentioned below. Further, a width W (illustrated in FIG. 2) of the liquid column resonance chamber 18 is preferably less than ½ of the length L so that an extra frequency is not applied to the liquid column resonance. Furthermore, it is preferable to provide multiple liquid resonance chambers 18 in one liquid column resonance droplet forming unit 10 to dramatically improve the productivity of the particulate material such as toner (as illustrated in FIG. 2 in which multiple liquid column resonance droplet ejecting devices 11 (multiple resonance chambers 18) are arranged side by side). The number of the liquid resonance chambers 18 is not particularly limited, but it is most preferable that 100 to 2,000 liquid resonance chambers 18 are provided in one droplet forming unit 10 so that the particulate material production apparatus (toner production apparatus) has a good combination of productivity and operationality. In this regard, a liquid supply passage is connected with each of the liquid column resonance chambers while connected with the common liquid passage 17 to supply the particulate material composition liquid, and therefore the common liquid passage 17 is connected with the multiple liquid column resonance chambers 18.

In FIGS. 1 and 2, numeral 12 denotes a gas flow passage.

The vibration generating device 20 of the liquid column resonance droplet ejecting device 11 is not particularly limited as long as the device can be vibrated at a predetermined frequency, but is preferably a device in which a piezoelectric material is adhered to an elastic plate 9. In this regard, the elastic plate 9 constitutes part of the wall of the liquid column resonance chamber 18 to prevent the piezoelectric material form being contacted with the particulate material composition liquid 14. Specific examples of the materials for use as the piezoelectric material include piezoelectric ceramics such as lead zirconate titanate (PZT). However, in general the amount of displacement of such a material is small, and therefore laminates of piezoelectric materials are typically used therefor. In addition, piezoelectric polymers such as polyvinylidene fluoride (PVDF) and single crystals such as quart, $LiNbO_3$, $LiTaO_3$, and $KNbO_3$ can also be used as the piezoelectric material. Further, the vibration generating device 20 is preferably arranged in each liquid column resonance chamber 18 to control vibration of the chamber. In addition, the vibration generating device 20 preferably has a structure such that a block of a vibrating member is cut so as to be arranged in each liquid column resonance chamber so that vibration of each liquid column resonance chamber can be separately controlled by the vibrating member via an elastic plate.

The diameter of each of the ejection nozzles 19 is preferably from 1 μm to 40 μm. When the diameter is less than 1 μm, the diameter of ejected droplets becomes too small, and therefore it often becomes difficult to produce a particulate material (such as toner particles) having a desired particle diameter. In addition, when the particulate material composition liquid includes a solid particulate material such as pigments, the nozzle clogging problem is often caused, thereby deteriorating the productivity of the particulate material. In contrast, when the diameter is greater than 40 μm, the diameter of ejected droplets becomes too large. When toner particles having a diameter of from 3 μm to 6 μm are prepared using such large droplets, the particulate material composition liquid (toner composition liquid) has to have a very low solid content (i.e., the particulate material composition liquid has to be diluted so as to be a thin liquid), and a large amount of energy is used for drying the ejected droplets to obtain a predetermined amount of toner, resulting in deterioration of productivity and increase of production costs.

In addition, it can be understood form FIG. 2 that the ejection nozzles 19 are preferably arranged so as to extend in the width direction of the liquid column resonance chamber 18, because the number of nozzles can be increased, thereby raising the production efficiency of the particulate material. Since the liquid column resonance frequency changes depending on the position of the ejection nozzles 19, it is preferable to properly determine the liquid column resonance frequency by checking whether desired droplets are ejected from the ejection nozzles 19.

Although the ejection nozzles 19 illustrated in FIG. 1 has a cross-section with a tapered shape (i.e., a trapezoidal shape) such that the diameter of the opening of a nozzle decreases toward the exit, the shape of the cross-section is not limited thereto, and can be selected from various shapes.

Examples of the cross-section of the ejection nozzles 19 are illustrated in FIGS. 3A-3D.

Figure 3A:
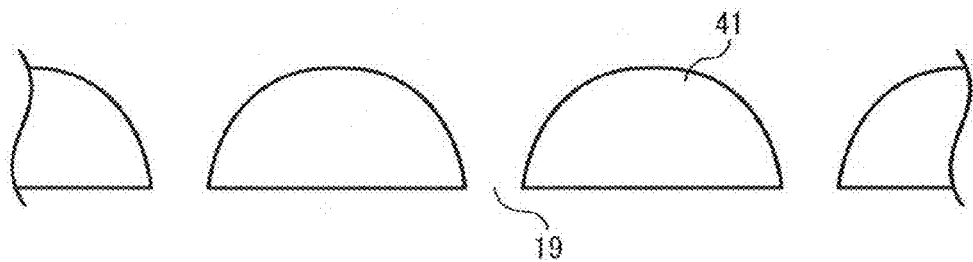
FIGS. 3A-3D are schematic cross-sectional views illustrating examples of the ejection nozzles of the droplet ejecting device.

The ejection nozzles illustrated in FIG. 3A have a cross-section such that a thin film 41 forming the nozzles 19 has a round surface from an upper surface thereof contacted with the liquid 14 toward the bottom surface thereof forming the nozzle 19 in such a manner that the gap between one thin film and the adjacent thin film (i.e., nozzle) narrows toward the exit. When the thin film 41 is vibrated, the pressure applied to the liquid at the exit of the nozzle 19 is maximized. Therefore, the shape of the nozzles illustrated in FIG. 3A is most preferable to stably eject droplets.

Figure 3B:
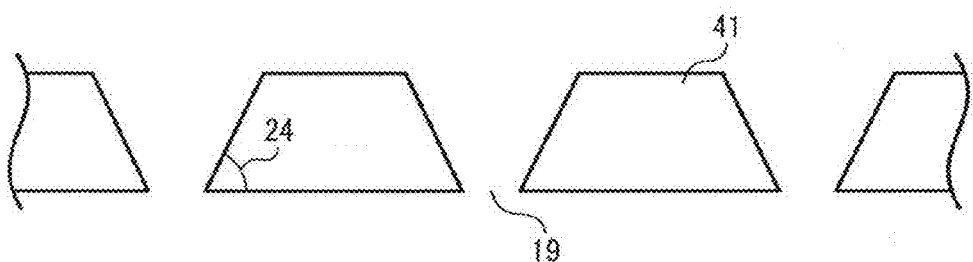

The ejection nozzles illustrated in FIG. 3B have a cross-section such that the thin film 41 forming the nozzles 19 is tapered from an upper surface thereof contacted with the liquid toward the bottom surface thereof forming the nozzles 19 in such a manner that the gap between one thin film and the adjacent thin film narrows toward the exit at a constant rate (namely the surface of the thin film 41 is slanted at a constant angle (i.e., nozzle angle 24)). The nozzle angle 24 can be set to a proper angle. Similarly to the nozzles illustrated in FIG. 3A, when the thin film 41 is vibrated, the pressure applied to the liquid at the exit of the nozzles 19 can be increased due to this nozzle angle 24. The nozzle angle 24 is preferably from 60° to 90°. When the nozzle angle 24 is not less than 60°, a sufficient pressure can be applied to the liquid, and in addition the thin film 41 has good processability (i.e., the thin film 41 can be easily prepared). When the nozzle angle 24 is 90°, the nozzles are the same as the nozzles illustrated in FIG. 3C. In the nozzles illustrated in FIG. 3C, it becomes hard to apply a pressure to the exit of the nozzle 19. Therefore, the maximum of the nozzle angle 24 is 90°. When the nozzle angle 24 is greater than 90°, it is hard to apply a pressure to the exit of the nozzle 19, thereby seriously destabilizing ejection of droplets.

Figure 3C:
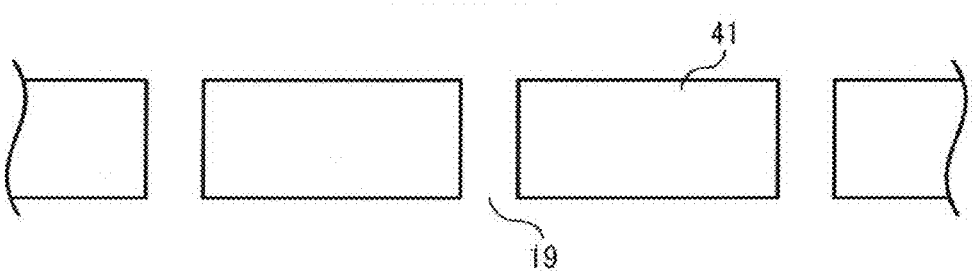
Figure 3D:
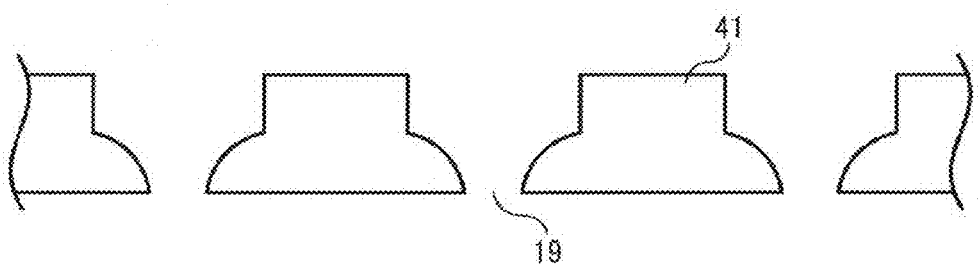

The ejection nozzles illustrated in FIG. 3D have a cross-section having a combined shape of the shape illustrated in FIG. 3A and the shape illustrated in FIG. 3C. It is possible that the shape of the ejection nozzles 19 is stepwise changed like the nozzles illustrated in FIG. 3D.

Next, the mechanism of forming droplets in the liquid column resonance droplet forming unit 10 utilizing liquid column resonance will be described.

Initially, the principle of the liquid column resonance phenomenon caused in the liquid column resonance chamber 18 of the liquid column resonance droplet ejecting device 11 illustrated in FIG. 1 will be described. The wavelength ($\lambda$) of resonance of the particulate material composition liquid (hereinafter referred to as the toner composition liquid) 14 in the liquid column resonance chamber 18 is represented by the following equation (1):

$$\lambda = c/f \quad (1),$$

wherein c represents the acoustic velocity in the toner composition liquid, and f represents the frequency of vibration applied to the toner composition liquid by the vibration generating device 20.

As illustrated in FIG. 1, the length between the first end wall of the liquid column resonance chamber 18 and the second end wall of the column resonance chamber closer to the common liquid passage 17 is L. In addition, the height h1 (which is about 80 μm) of the second end wall is about twice the height h2 (which is about 40 μm) of the opening communicating the liquid column resonance chamber 18 with the common liquid passage 17. Provided that both the end walls are closed (i.e., the chamber 18 has two fixed ends), resonance can be formed most efficiently if the length L satisfied the following equation (2):

$$L = (N/4)\lambda \quad (2),$$

wherein N represents an even number.

Even in a chamber having two open ends, the above-mentioned equation (2) is also satisfied.

Similarly, in a chamber having one end, which has an escape route and which is equivalent to an open end, and one closed end (fixed end), namely, in a chamber having one fixed end or one open end, resonance can be formed most efficiently when the length L is equal to an odd multiple of one fourth of the wavelength $\lambda$. Namely, N is an odd number in the above-mentioned equation (2).

The most efficient drive frequency f, at which the resonance can be formed most efficiently, is represented by the following equation (3), which is obtained from the above-mentioned equations (1) and (2):

$$f = N \times c/(4L) \quad (3).$$

However, since liquids have viscosity, the resonance is decayed, and therefore vibration is not endlessly amplified. Namely, a liquid has a Q value, and, as represented by the below-mentioned equations (4) and (5), the liquid can cause resonance even at a frequency in the vicinity of the above-mentioned most efficient frequency f represented by equation (3).

FIGS. 4A-4D illustrate standing waves (in a resonance mode) of velocity fluctuation and pressure fluctuation when N is 1, 2 or 3. FIGS. 5A-5C illustrate standing waves (in a resonance mode) of velocity fluctuation and pressure fluctuation when N is 4 or 5. In reality, the waves are a compression wave (longitudinal wave), but are generally illustrated as such waves as illustrated in FIGS. 4 and 5. In FIGS. 4 and 5, a velocity standing wave is illustrated by a solid line, and a pressure standing wave is illustrated by a broken line.

Figure 4A:
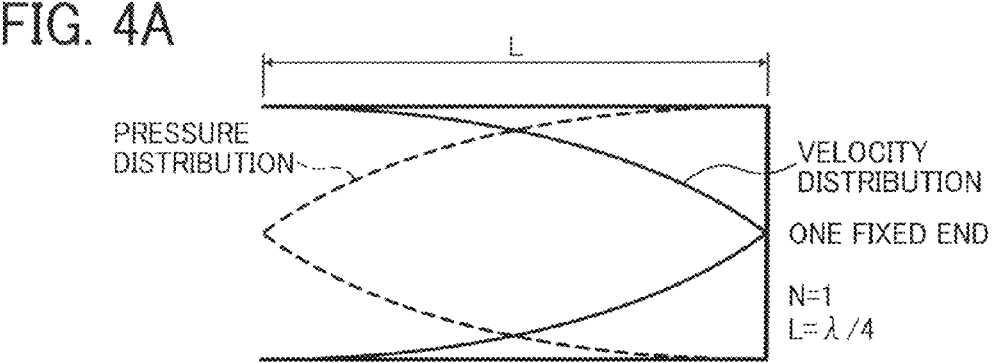
FIGS. 4A-4D are schematic views illustrating standing waves of velocity fluctuation and pressure fluctuation formed when N=1, 2 or 3.

For example, in a case illustrated in FIG. 4A, in which the liquid column resonance chamber has one fixed end and N is 1, the frequency of the velocity distribution becomes zero at the closed end while having a maximum value at the open end. Thus, it can be easily understood intuitively. When the length between the ends of the liquid column resonance chamber in the longitudinal direction thereof is L, the wavelength of resonance is $\lambda$, and N is 1, 2, 3, 4 or 5, the standing wave can be formed most efficiently. Since the shape of the standing wave changes depending on the states (i.e., opened or closed state) of both the ends of the liquid column resonance chamber, the shapes of the standing wave in the states are also illustrated in FIGS. 4 and 5. As mentioned later, the states of the ends are determined depending on the conditions of the openings of the ejection nozzles and the opening from which the liquid 14 is supplied to the chamber 18.

In acoustics, an open end means an end at which the moving velocity of a medium (liquid) in the longitudinal direction is maximized while the pressure is minimized. In contrast, a closed end is defined as an end at which the moving velocity of a medium becomes zero. Namely, the closed end is considered to be a hard wall in acoustics, and reflection of a wave is caused. When the liquid column resonance chamber has an ideal open end or an ideal closed end, such resonance standing waves as illustrated in FIGS. 4 and 5 are formed. However, the pattern of the standing waves changes depending on the number of the ejection nozzles and the positions of the nozzles, and therefore the most efficient frequency f may be slightly different from that obtained from equation (3). In such a case, by adjusting the drive frequency, stable ejection conditions can be established.

For example, in a case where the acoustic velocity c is 1,200 m/s in the liquid used, the length L of the liquid column resonance chamber 18 is 1.85 mm, both the ends are equivalent to closed ends, and the resonance mode is an N=2 resonance mode, the most efficient frequency f is determined as 324 kHz from the above-mentioned equation (3). In addition, in another case where the acoustic velocity c is 1,200 m/s in the liquid, the length L of the liquid column resonance chamber is 1.85 mm, both the ends are equivalent to closed ends, and the resonance mode is an N=4 resonance mode, the most efficient frequency f is determined as 648 kHz from equation (3). In the latter case, higher-degree resonance can be used than in the former case although the structures of the liquid column resonance chambers are the same.

Figure 4B:
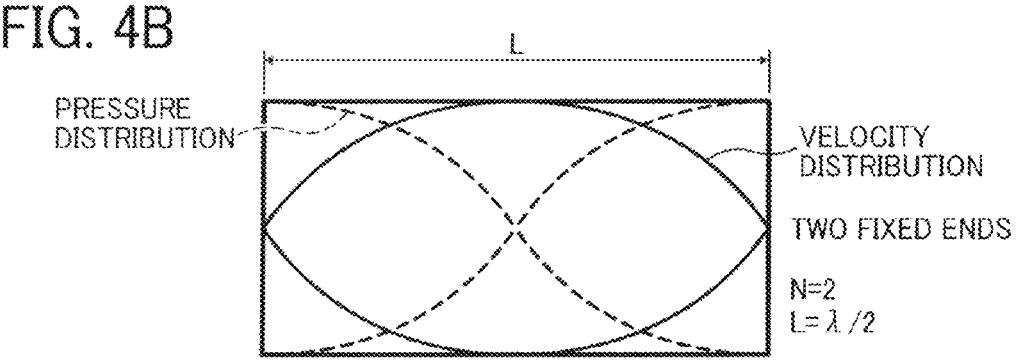
Figure 4C:
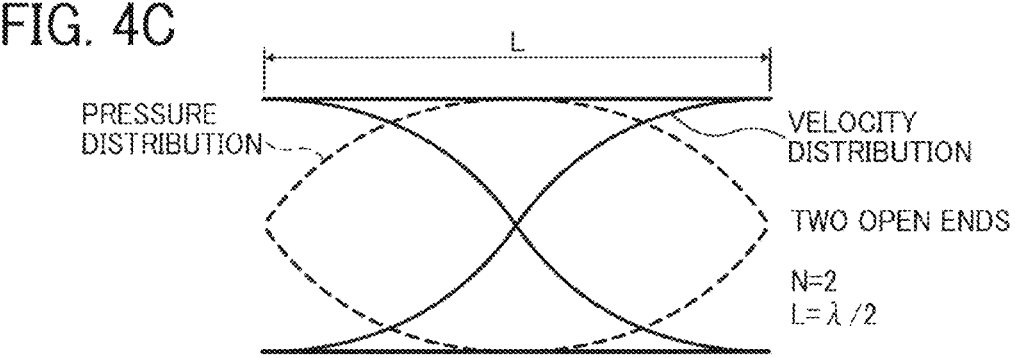
Figure 4D:
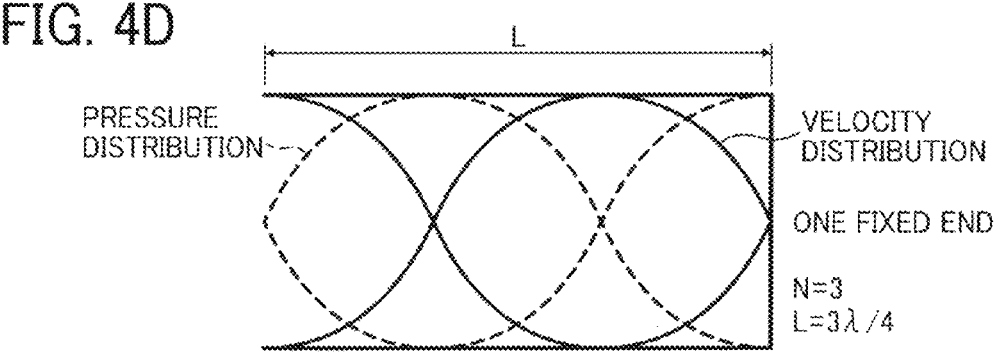
Figure 5A:
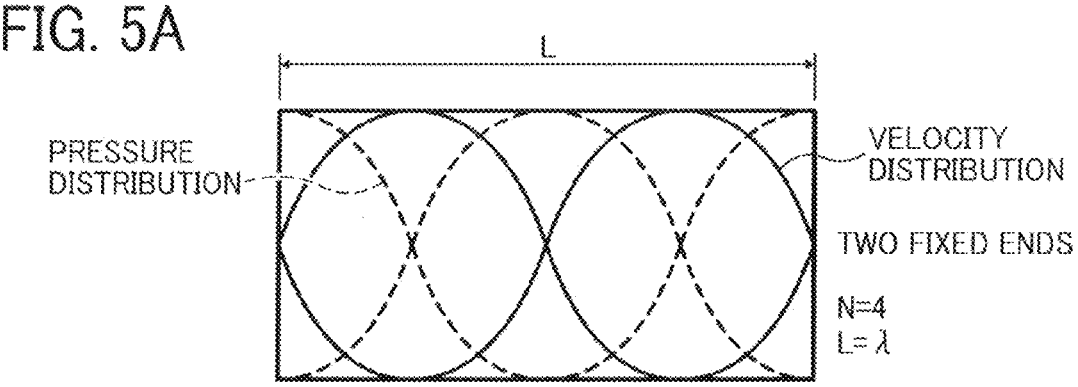
FIGS. 5A-5C are schematic views illustrating standing waves of velocity fluctuation and pressure fluctuation formed when N=4 or 5.
Figure 5B:
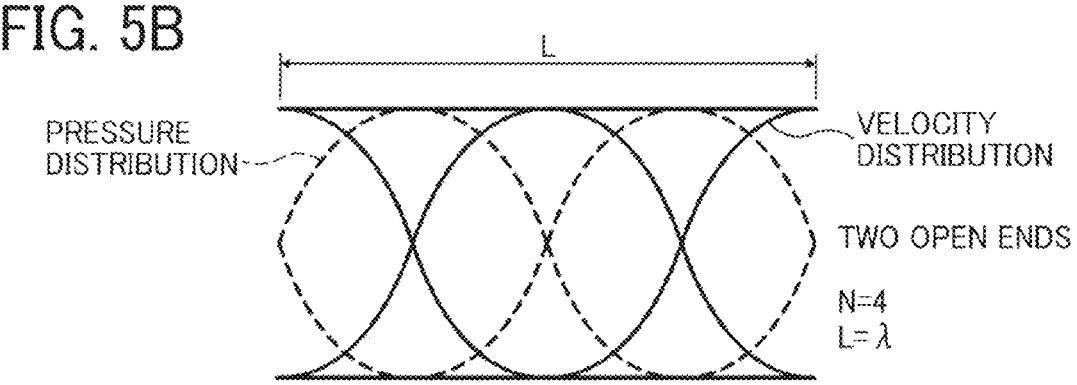
Figure 5C:
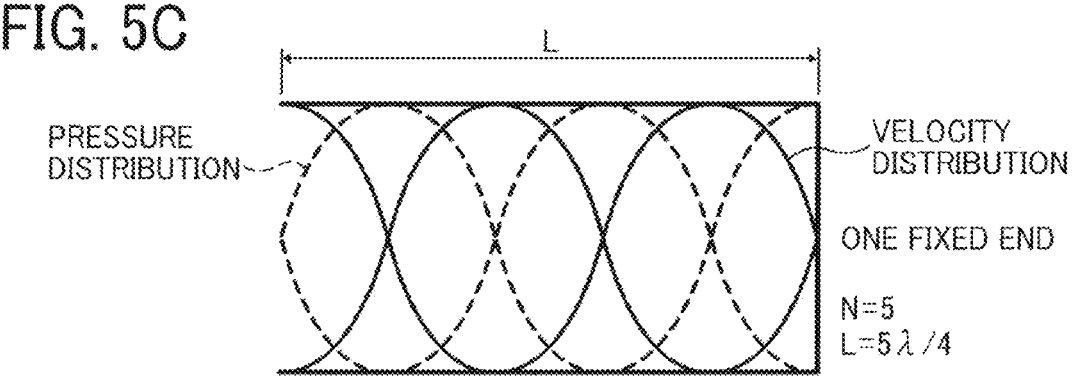

It is preferable for the liquid column resonance chamber 18 of the liquid column resonance droplet ejecting device 11 illustrated in FIG. 1 that both the ends thereof are equivalent to two closed ends or ends considered to be acoustically soft walls due to the openings of the nozzles to increase the most efficient frequency. However, the ends of the liquid column resonance chamber 18 are not limited thereto, and can be open ends. In this regard, the influence of the openings of the ejection nozzles is such that the acoustic impedance is decreased thereby, and particularly the compliance is increased thereby. Therefore, the liquid column resonance chamber 18 preferably has such a structure as illustrated in FIG. 4B or 5A, in which walls are formed at both the ends of the liquid column resonance chamber in the longitudinal direction thereof, because all of the resonance modes in the two-closed-end structures and the resonance modes in the one-open-end structures in which the wall on the nozzle side is considered to be an open end can be used.

Since the factors contributing to determination of the drive frequency are the number of openings of the ejection nozzles, the positions of the openings, and the cross-sectional shape of the ejection nozzles, the drive frequency can be properly determined according to these factors. For example, when the number of openings of the ejection nozzles is increased, the fixed end of the liquid column resonance chamber is loosely bounded so as to be similar to an open end, and the generated standing wave becomes similar to a standing wave formed in a chamber having an open end, resulting in increase of the drive frequency. In this case, the wall of the liquid column resonance chamber in the vicinity of the nozzles is loosely restricted, wherein the opening (nozzle) closer to the common liquid passage 17 is an origin. Further, when the ejection nozzles have a round cross-section, or the volume of the nozzles varies depending on the thickness of the frame of the chamber having the nozzles, the real standing wave has a shorter wavelength, and therefore the frequency of the wave becomes higher than the drive frequency.

When a voltage is applied to the vibration generating device at the thus determined drive frequency, the vibration generating device is deformed and thereby a resonance standing wave can be generated most efficiently at the drive frequency. In this regard, a resonance standing wave can also be generated at a frequency in the vicinity of the most efficient drive frequency. Namely, when the length between both the ends of the liquid column resonance chamber in the longitudinal direction thereof is L, and the length between the end of the chamber closer to the common liquid passage and the nozzle closest to the end is Le, droplets of the toner composition liquid 14 can be ejected from the nozzles 19 by liquid column resonance caused by vibrating the vibration generating device using a drive wave including, as a main component, a drive frequency f in the range represented by the following relationships (4) and (5):

$$N \times c/(4L) \le f \le N \times c/(4Le) \quad (4), \text{ and}$$

$$N \times c/(4L) \le f \le (N+1) \times c/(4Le) \quad (5),$$

wherein c represents the velocity of sound wave in the toner composition liquid, and N represents a positive integer.

The ratio (Le/L) of the length Le between the end of the chamber closer to the common liquid passage and the nozzle closest to the end to the length L between both the ends of the liquid column resonance chamber in the longitudinal direction thereof is preferably greater than 0.6.

By utilizing the liquid column resonance phenomenon mentioned above, a liquid column resonance standing wave of pressure is formed in the liquid column resonance chamber 18 illustrated in FIG. 1, thereby continuously ejecting droplets 21 of the toner composition liquid 14 from the ejection nozzles 19, which are arranged on a portion of the liquid column resonance chamber 18. In this regard, it is preferable to arrange the ejection nozzles 19 on a position, at which the pressure of the standing wave varies most largely, because the droplet ejection efficiency is enhanced, and thereby the droplet ejecting unit can be driven at a low voltage.

Although it is possible that one liquid column resonance chamber 18 has one ejection nozzle, it is preferable that one chamber has multiple ejection nozzles, preferably from 2 to 100 nozzles, to enhance the productivity. When the number of nozzles is greater than 100, the voltage applied to the vibration generating device 20 has to be increased in order to form droplets having a desired particle diameter. In this case, the piezoelectric material serving as the vibration generating device tends to operate unstably.

The distance between two adjacent ejection nozzles is preferably not less than 20 μm and less than the length of the liquid column resonance chamber 18. When the distance between two adjacent nozzles is less than 20 μm, the chance of collision of droplets ejected from the two adjacent nozzles is increased, thereby forming large particles, resulting in deterioration of the particle diameter distribution of the resultant toner.

Next, the liquid column resonance phenomenon caused in the liquid column resonance chamber 18 in the liquid column resonance droplet ejecting device 11 will be described by reference to FIGS. 6A-6D. In FIGS. 6A-6D, a solid line represents the velocity distribution of the toner component liquid 14 at any position of from the fixed end to the other end closer to the common liquid passage 17 (illustrated in FIG. 1). In this regard, when the solid line is present in a positive (+) region, the toner component liquid 14 flows from the common liquid passage 17 toward the liquid column resonance chamber 18. When the solid line is present in a negative (−) region, the toner component liquid 14 flows in the opposite direction. A broken line represents the pressure distribution of the toner component liquid 14 at any position of from the fixed end to the other end closer to the common liquid passage 17. In this regard, when the broken line is present in a positive (+) region, the pressure in the chamber 18 is higher than atmospheric pressure (i.e., the pressure is a positive pressure). When the broken line is present in a negative (−) region, the pressure is lower than atmospheric pressure (i.e., the pressure is a negative pressure). Specifically, when the pressure in the chamber 18 is a positive pressure, a downward pressure is applied to the toner component liquid 14 in FIG. 6. In contrast, when the pressure is a negative pressure, an upward pressure is applied to the toner component liquid in FIG. 6. In this regard, although the end of the liquid column resonance chamber 18 closer to the common liquid passage 17 is opened as mentioned above, the height (h1 in FIG. 1) of the frame (fixed end) of the liquid column resonance chamber 18 is not less than about twice the height (h2 in FIG. 1) of the opening connecting the chamber 18 with the common liquid passage 17, and therefore temporal changes of the velocity distribution curve and the pressure distribution curve are illustrated in FIGS. 6A-6D while assuming that the liquid column resonance chamber 18 has two fixed ends.

Figure 6A:
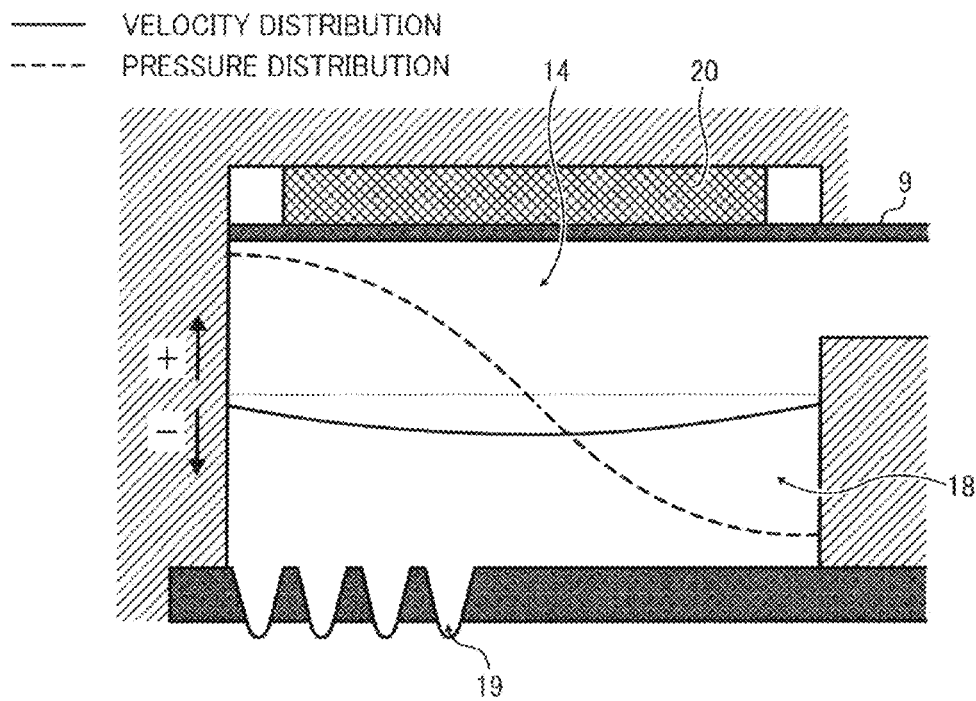
FIGS. 6A-6D are schematic views illustrating how a liquid column resonance phenomenon occurs in a liquid column resonance chamber of the droplet ejecting device.
Figure 6B:
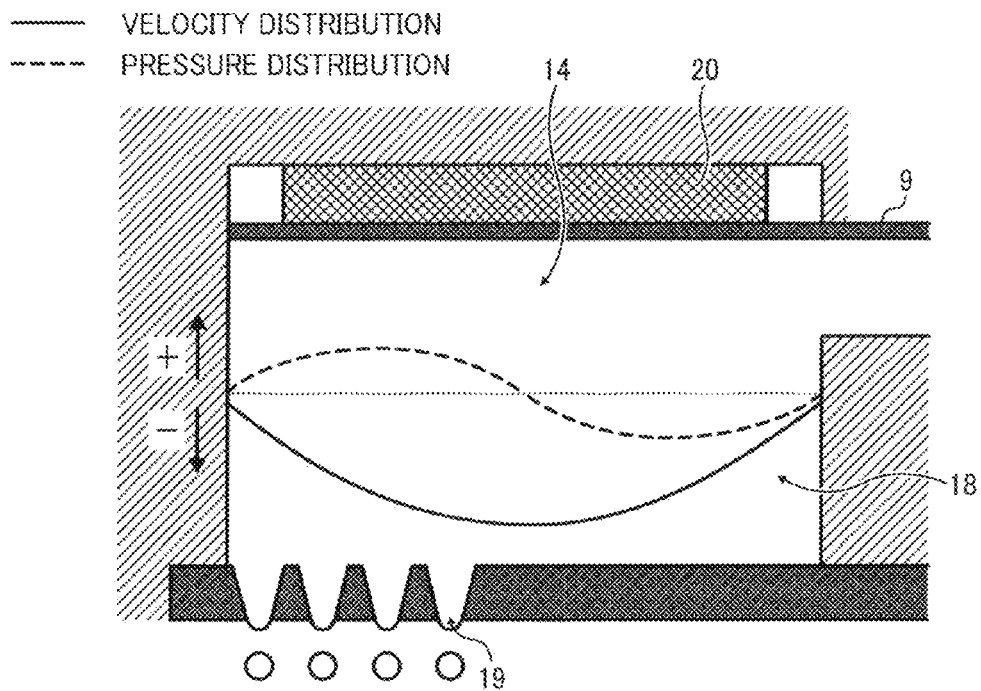

FIG. 6A illustrates the pressure waveform and the velocity waveform in the liquid column resonance chamber 18 just when droplets are ejected from the droplet ejection nozzles 19. As illustrated in FIG. 6A, the pressure in a portion of the toner component liquid above the nozzles 19 in the liquid column resonance chamber 18 is maximized, and thereby the toner component liquid is excluded from the nozzles 19 as liquid columns. Next, as illustrated in FIG. 6B, the positive pressure in the vicinity of the nozzles 19 is decreased so as to approach the negative region (pressure), and thereby the liquid columns of the toner component liquid are cut, resulting in ejection of the droplets 21.

Figure 6C:
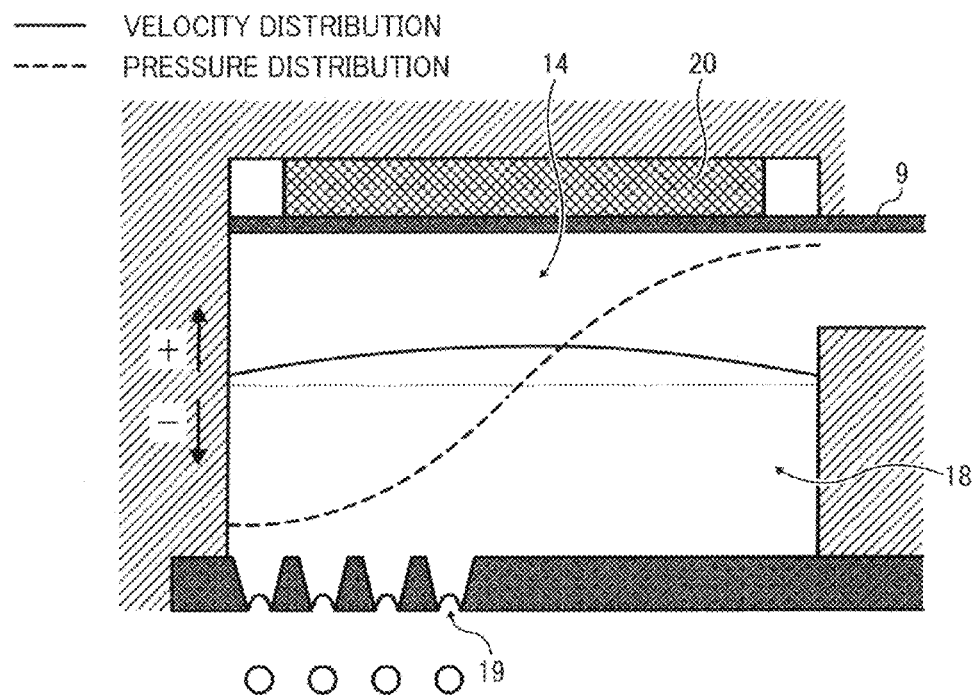
Figure 6D:
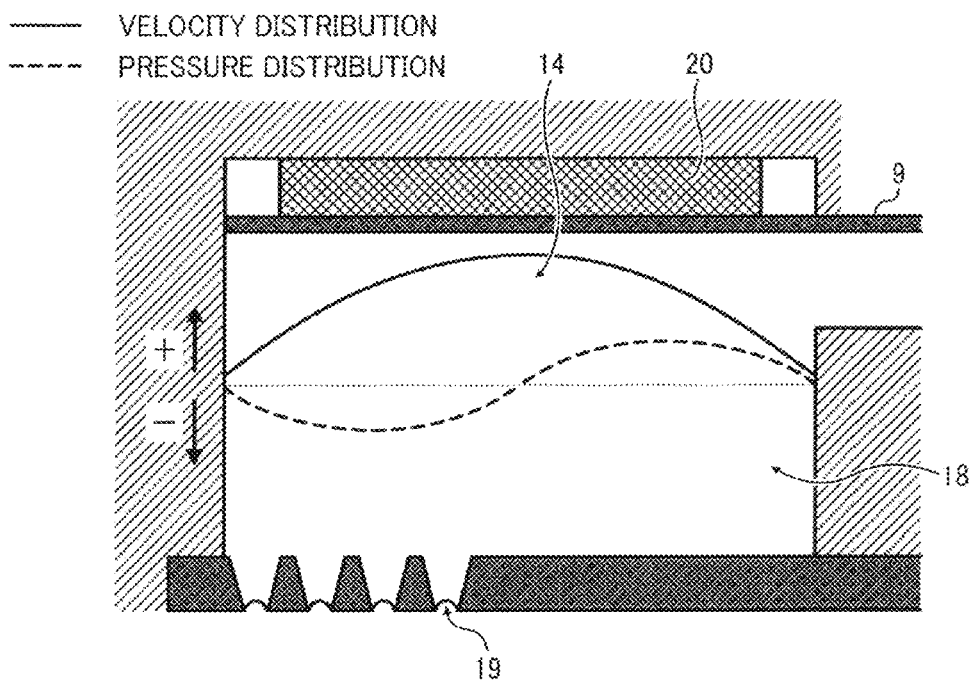

After droplets are ejected, the pressure in the vicinity of the ejection nozzles 19 is minimized (i.e., maximized in the negative region) as illustrated in FIG. 6C. In this case, feeding the toner composition liquid 14 to the liquid column resonance chamber 18 from the common liquid passage 17 is started. Next, as illustrated in FIG. 6D, the negative pressure in the vicinity of the ejection nozzles 19 is decreased, and the pressure is changed toward a positive pressure. Thus, filling the toner composition liquid 14 is completed. Next, the positive pressure in the droplet ejection area of the liquid column resonance chamber 18 is maximized as illustrated in FIG. 6A, and then the droplets 21 of the toner component liquid 14 are ejected from the ejection nozzles 19. Thus, the droplets 21 are continuously ejected from the ejection nozzles 19.

Figure 7:
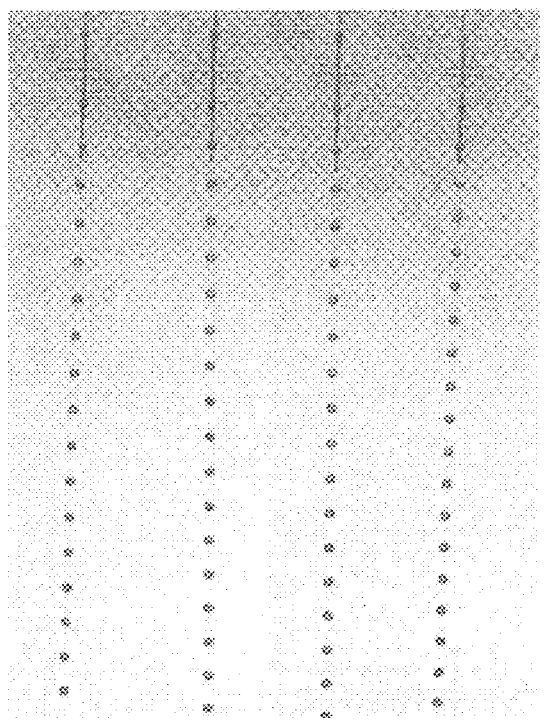
FIG. 7 is a photograph of droplets ejected from the droplet ejecting unit, which is taken by a laser shadowgraphy method.

An experiment on this droplet ejection operation was performed. Specifically, in the droplet ejecting head used for this experiment, the length (L) of the liquid column resonance chamber 18 is 1.85 mm, and N is 2. In addition, the droplet ejection nozzles 19 have four nozzles (i.e., first to fourth nozzles) at a location corresponding to the antinode of the pressure standing wave in the N=2 mode. Further, a sine wave having a frequency of 340 kHz is used to eject droplets of a toner composition liquid. FIG. 7 is a photograph, which is taken by using a laser shadowgraphy method and which shows droplets of the toner composition liquid ejected from the four nozzles. It can be understood from FIG. 7 that droplets having substantially the same particle diameter can be ejected from the four nozzles at substantially the same velocity.

Figure 8:
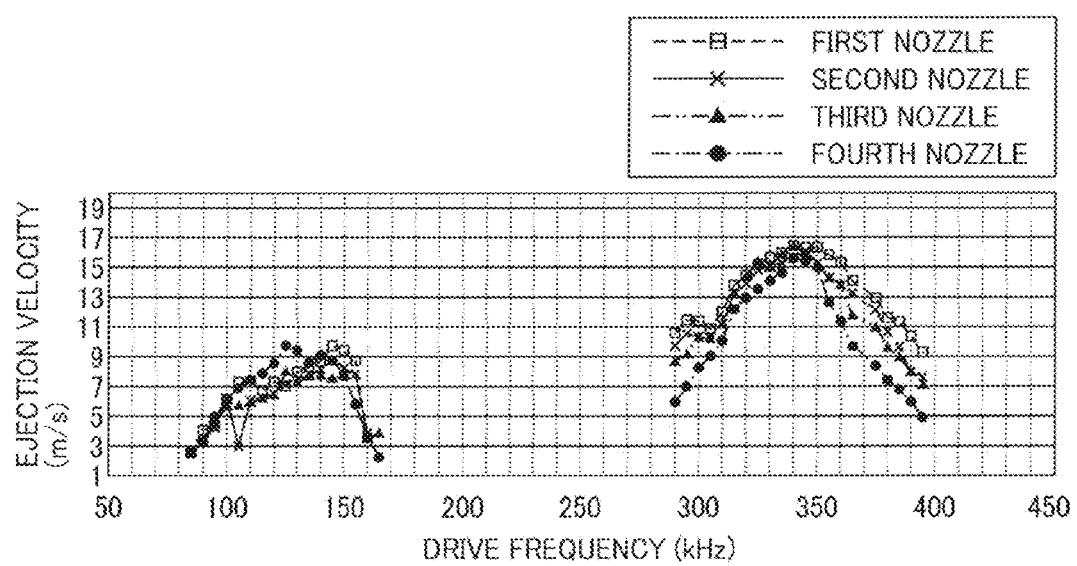
FIG. 8 is a graph showing the relation between the drive frequency of vibration and the velocity of ejected droplets.

FIG. 8 is a graph showing the velocity of droplets ejected from the first to fourth nozzles when using a sine wave with a drive frequency in a range of from 290 kHz to 395 kHz. It can be understood from FIG. 8 that at the frequency of 340 kHz, the velocities of droplets ejected from the first to fourth nozzles are substantially the same while the velocities are maximized. Namely, it could be confirmed that droplets of the toner composition liquid are evenly ejected from the antinode of the liquid column resonance standing wave when the second mode is used (i.e., when the liquid column resonance frequency is 340 kHz).

In addition, the velocities of droplets ejected from the first to fourth nozzles when the first mode is used (i.e., when the liquid column resonance frequency is 130 kHz) are shown on the left side of the graph (FIG. 8). It can also be understood from FIG. 8 that droplets are not ejected between the first mode (130 kHz) and the second mode (340 kHz). This frequency characteristic is specific to liquid column resonance standing waves, and therefore it was confirmed that liquid column resonance occurs in the chamber 18.

Next, collection of the particulate material (toner) will be described.

By collecting the droplets of the particulate material composition liquid (toner composition liquid), which are ejected from the droplet ejecting device 11, in a poor solvent for the particulate material composition (toner), the particulate material can be prepared. The poor solvent hardly dissolve the particulate material composition, and includes water and/or an organic solvent.

Figure 9:
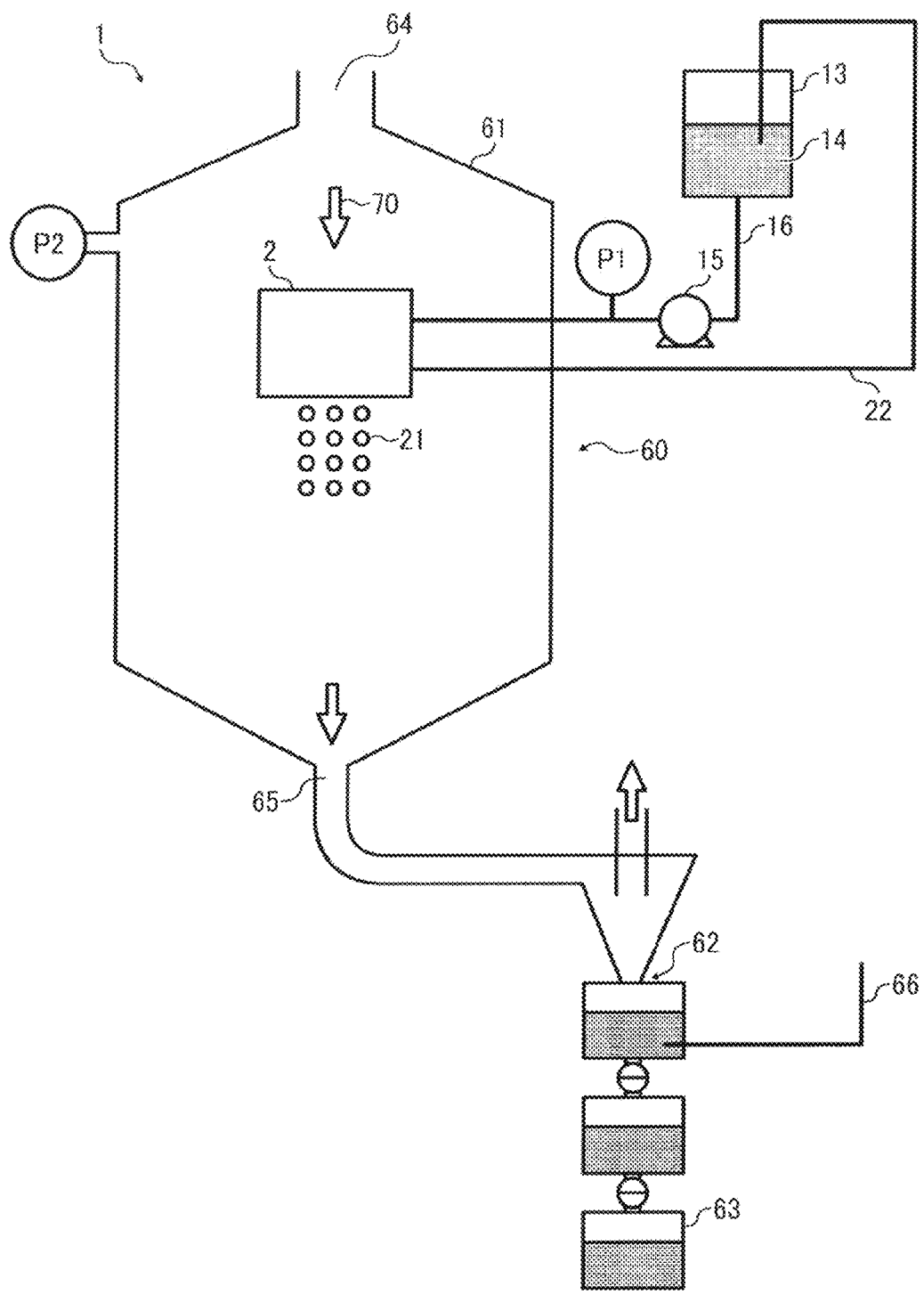
FIG. 9 is a schematic view illustrating a particulate material production apparatus according to an embodiment.
Figure 10:
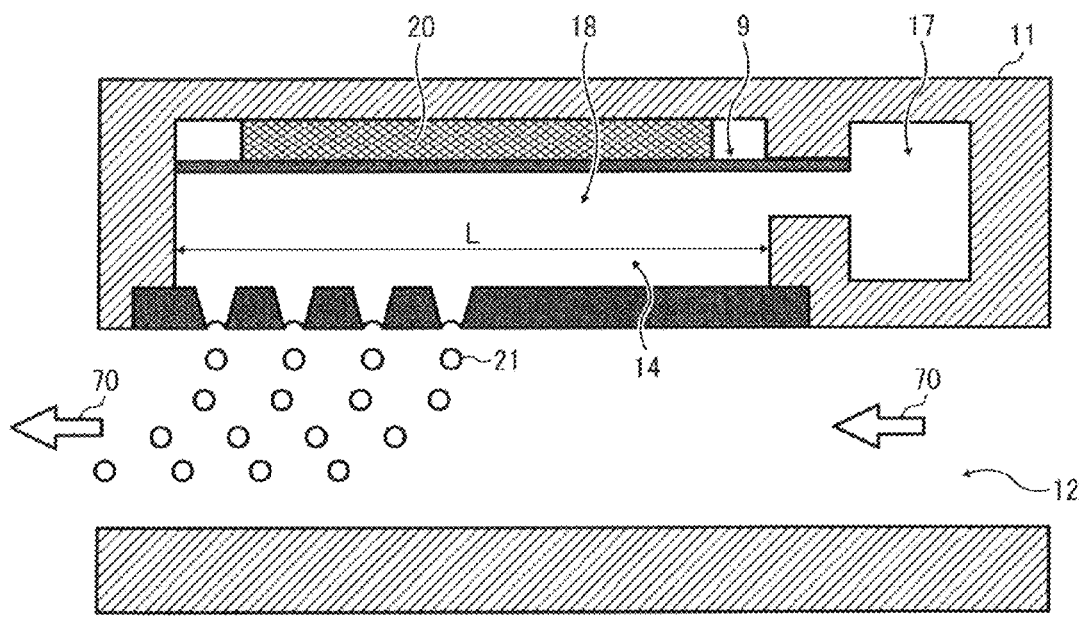
FIG. 10 is a schematic view for describing a particle unity preventing method.
Figure 11:
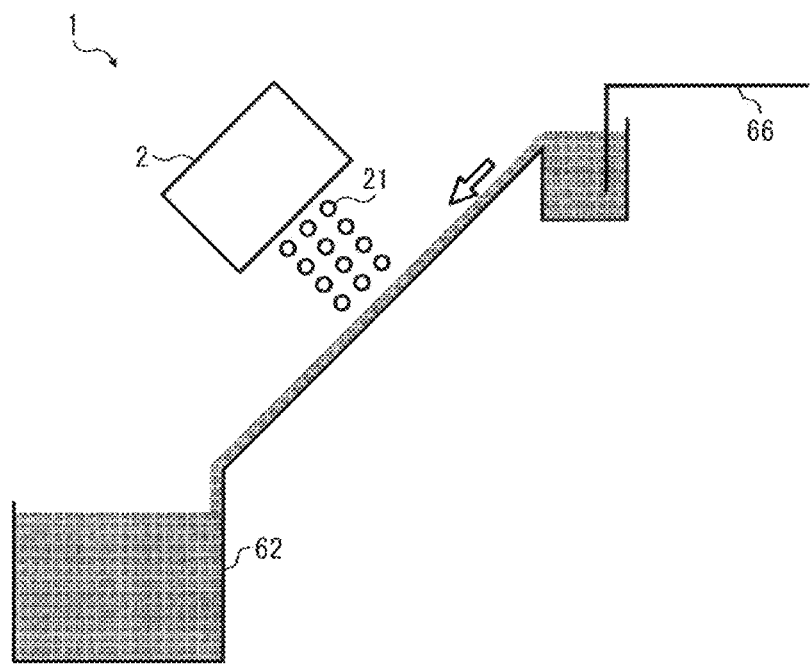
FIG. 11 is a schematic view illustrating another particulate material production apparatus.
Figure 12:
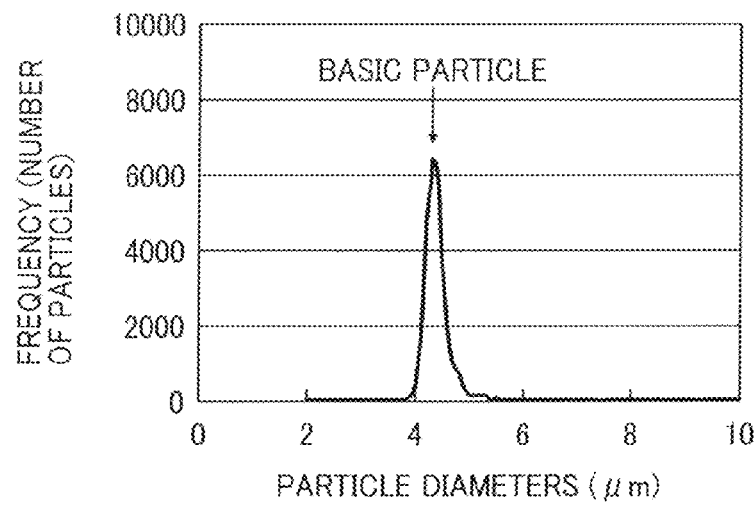
FIG. 12 is a graph showing the particle diameter distribution of a toner which is prepared by preventing uniting of ejected droplets and which is substantially constituted of basic particles.
Figure 13:
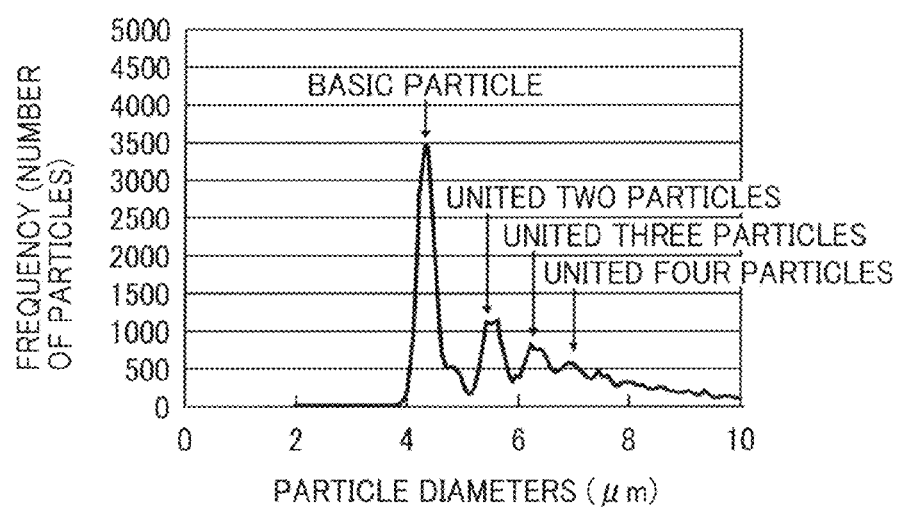
FIG. 13 is a graph showing the particle diameter distribution of a toner which is prepared by a method unable to prevent uniting of ejected droplets.

FIG. 9 illustrates an example of the particulate material production apparatus of this disclosure. Referring to FIG. 1, a particulate material production apparatus 1 has a particle collecting device 62 (serving as a poor solvent contacting device), which is a collecting portion of a cyclone and in which a poor solvent is contained. It is preferable that before contacting the droplets 21, which are ejected from the droplet forming unit 10 of a droplet ejecting unit 2, with the poor solvent, the organic solvent included in the droplets 21 are evaporated so that the droplets are solidified to some extent. Alternatively, as illustrated in FIG. 11, the droplets 21 may be fed into a poor solvent right after the droplets are ejected. In this case, the poor solvent is preferably flown as illustrated in FIG. 11 so that the concentration of the droplets in the poor solvent becomes constant.

In order to enhance the wettability of the droplets 21 with the poor solvent, a surfactant can be added to the droplets and/or the poor solvent. The droplets (particles) fed into the poor solvent can be subjected to a solvent removing treatment, and/or a washing treatment to remove the surfactant, if desired.

Next, the particle collecting device to collect particles from the poor solvent will be described.

Particles included in the poor solvent can be collected using a powder collecting device such as a filter press or a centrifugal separator. By using such a collecting device, a slurry including particles can be obtained. By drying the slurry using a dryer such as a fluidized bed dryer or a vacuum dryer, the solvent included in the slurry can be removed, resulting in formation of the particulate material.

Referring back to FIG. 9, the particulate material production apparatus 1 includes the droplet ejecting unit 2, and a drying and collecting unit 60 as main devices. The droplet ejecting unit 2 includes the droplet forming unit 10 (illustrated in FIG. 2), the raw material container 13 to contain the particulate material composition liquid 14, and the liquid supply tube 16 through which the particulate material composition liquid 14 in the raw material container 13 is fed to the droplet forming unit 10 of the droplet ejecting unit 2. The liquid supply tube 16 is connected with the circulating pump 15 to feed the particulate material composition liquid 14 upon application of pressure thereto. The particulate material composition liquid 14 is supplied to droplet forming unit 10 of the droplet ejecting unit 2, and part of the liquid is ejected from the droplet forming unit, and the residual liquid, which is not used for forming droplets, is returned to the raw material container 13 through a liquid return tube 22.

A pressure gauge P1 and another pressure gauge P2 are respectively set on the liquid supply tube 16 and a chamber 61 of the drying and collecting unit 60 to control the pressure to the particulate material composition liquid 14 fed to the droplet forming unit 10 of the droplet ejecting unit 2 and the pressure in the chamber 61. In this regard, when the pressure P1 is greater than P2 (P1>P2), the particulate material composition liquid 14 tends to exude from the nozzles 19. In addition, when the pressure P1 is less than P2 (P1<P2), a gas (air) tends to enter into the droplet ejecting unit, thereby often stopping ejection of droplets. Therefore, it is preferable that the pressures P1 and P2 are substantially the same (P1≈P2).

A gas (such as air) is fed from a carrier gas entrance 64 to form a downward gas flow (hereinafter referred to as carrier airflow) 70 in the chamber 61. Not only the droplets 21 ejected from the droplet ejecting unit 2 fall by gravity thereof but also the droplets are fed downward by the carrier airflow 70. The droplets 21 are then collected by the particle collecting device 62. The collected particles are contained in a particle container 63. In FIG. 9, numeral 65 denotes an exit of the carrier gas and the particles, and numeral 66 denote a poor solvent supply tube.

Figure 14:
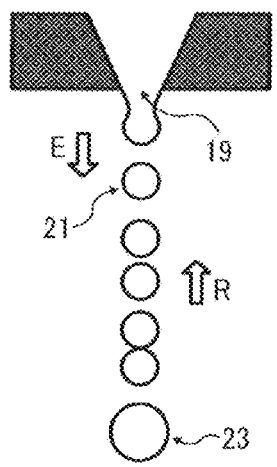
FIG. 14 is a schematic view for describing uniting of ejected droplets.
Figure 15:
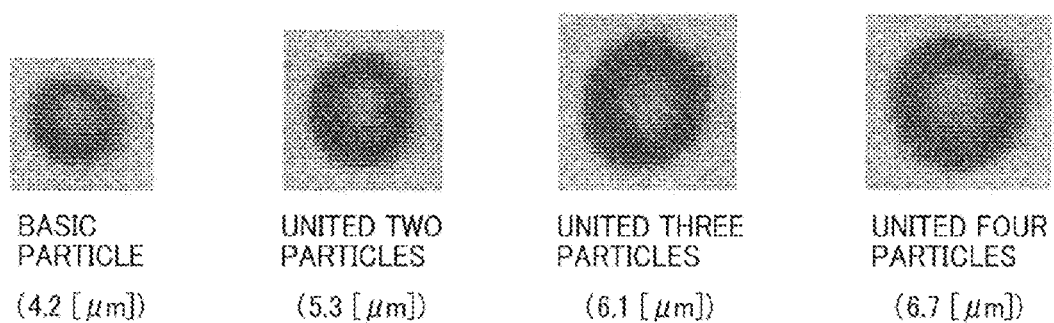
FIG. 15 is photographs of a basic particle and united particles taken by a flow particle image analyzer.

If two or more droplets ejected from the nozzles 19 are contacted with each other, the droplets are united and a large droplet is formed (i.e., a united droplet is formed) as illustrated in FIG. 14. In order to produce a particulate material having a sharp particle diameter distribution, formation of such a united droplet has to be prevented. Namely, it is necessary to keep the distance between two adjacent droplets. As illustrated in FIG. 14, a droplet 21 (first droplet) is ejected from the nozzle 19 at a constant initial speed in a direction E, but due to viscous resistance R of the gas (air), the speed of the first droplet 21 decreases. Therefore, a following droplet (second droplet) catches the first droplet 21, resulting in formation of a united droplet 23 of the first and second droplets. Since this phenomenon is steadily caused, the resultant particles have a broad particle diameter distribution if all the particles are collected. In order to prevent formation of the united droplet 23, decrease in speed of the droplets 21 has to be prevented so that two adjacent droplets are not contacted with each other. Therefore, in the particulate material production apparatus 1 illustrated in FIG. 9, the carrier airflow 70 is formed to solidify the droplets 21 while preventing formation of the united droplet 23, and the solidified particles are fed to the collecting device 62.

As illustrated in FIG. 1, part of the carrier airflow 70 is flown in a direction parallel to the ejecting direction of the droplets 21 to prevent decrease in speed of the droplets 21, resulting in prevention of formation of a united particle. Alternatively, part of the carrier airflow 70 is flown in a direction perpendicular to the ejecting direction of the droplets 21 as illustrated in FIG. 10. In addition, it is possible that the carrier airflow 70 is flown at an angle to the ejecting direction of the droplets 21 so that the ejected droplets are separated from each other. In the droplet ejecting device 11 illustrated in FIG. 10, it is preferable to adjust the direction of the carrier airflow 70 such that the track of a particle ejected from a nozzle does not overlap with the track of another particle ejected from another nozzle.

It is possible that after formation of a united particle is prevented using the above-mentioned carrier airflow 70 (first airflow), the droplets are fed to the collecting device 62 using a second carrier airflow.

The speed of the first carrier airflow 70 is preferably not lower than the droplet ejection speed. When the speed of the first carrier airflow 70 is lower than the droplet ejection speed, it is hard to carry out the purpose of the carrier airflow to prevent droplets from contacting each other, i.e., to prevent formation of a united droplet.

The property of the first carrier airflow 70 can be freely changed to securely prevent formation of a united droplet. Therefore, the property of the first carrier airflow is not necessarily the same as that of the second carrier airflow. It is possible for the first carrier airflow 70 to include a chemical (such as external additive for toner) capable of accelerating solidification of surface of droplets, such as a chemical adhered to the surface of droplets to prevent formation of a united droplet (particle).

FIG. 12 is a graph showing the particle diameter distribution of a particulate material (toner) which is substantially constituted of basic particles, which are not united and which have substantially the same particle diameter). Such a particulate material can be prepared by sufficiently drying the ejected droplets 21 without forming a united droplet.

FIG. 13 illustrates the particle diameter distribution of a particulate material (toner) including such united particles (large particles). In FIG. 13, the highest peak is specific to toner particles (basic toner particles) obtained by drying the ejected droplets without forming united droplets. The second highest peak is specific to toner particles obtained by drying united two droplets. Similarly, the third and fourth highest peaks are specific to toner particles obtained by drying united three or four droplets. It can be understood from FIG. 13 that there are toner particles obtained by drying united five or more droplets. This particle diameter distribution of a toner can be determined using a flow particle image analyzer FPIA-3000 from Sysmex Corp.

Photographs of united toner particles such as united two, three and four particles are shown in FIG. 15.

As illustrated in FIG. 14, a droplet 21 (first droplet) is ejected from the nozzle 19 at a constant initial speed in the direction E, but due to the viscous resistance R of the gas (air), the speed of the first droplet 21 decreases and falls naturally. When the speed of the first droplet decreases, the distance between the first droplet and the following (second) droplet decreases, and finally the following droplet catches the first droplet 21, resulting in formation of a united droplet 23 of the first and second droplets. The united droplet receives larger air resistance R, and therefore it takes more time to dry the united droplet. Therefore, the united droplet tends to be easily united with another droplet, thereby broadening the particle diameter distribution of the resultant particulate material.

The particle diameter distribution of a particulate material is typically represented by a ratio (Dv/Dn) of the volume average particle diameter (Dv) to the number average particle diameter (Dn) of the particulate material. The ratio (Dv/Dn) is 1.0 at minimum. In this case, all the particles have the same particle diameter. As the ratio (Dv/Dn) increases, the particulate material has a broad particle diameter distribution. Toner prepared by a pulverization method typically has a ratio (Dv/Dn) of from 1.15 to 1.25, and toner prepared by a polymerization method typically has a ratio (Dv/Dn) of from 1.10 to 1.15. It was confirmed that when toner prepared by the particulate material production method of this disclosure has a ratio (Dv/Dn) of not greater than 1.15, high quality toner images can be produced. The ratio (Dv/Dn) is more preferably not greater than 1.10.

In electrophotography, it is preferable to use a toner having as narrow particle diameter distribution as possible because the image developing process, the image transferring process and the image fixing process can be satisfactorily performed. Therefore, in order to stably produce high definition images, the Dv/Dn ratio of the toner is preferably not greater than 1.15, and more preferably not greater than 1.10.

When a poor solvent for the particulate material composition is not used for collecting droplets, such aggregated particles as illustrated in FIG. 16 are formed. These aggregated particles cannot be released from each other even when a mechanical force is applied thereto, and the aggregated particles behave as a particle having a larger diameter. Therefore it is not preferable to form such aggregated particles. In addition, such aggregated particles have a shape considerably different from sphere, and therefore it is not preferable to use a toner including such aggregated toner particles for electrophotography because images having poor image qualities are produced by the toner.

When droplets of a resin composition liquid are dried in an gas phase (such as air), and the resultant resin particles are collected by a cyclone or the like, the collected resin particles are easily aggregated as illustrated in FIG. 16 if the drying operation is insufficiently performed and the collected resin particles are contacted with each other. When preparing a toner or the like, which includes a thermoplastic resin, by drying droplets of a toner composition liquid, the temperature at which the particle collecting operation is performed has to be lower than the softening point of the thermoplastic resin to prevent softening of the thermoplastic resin. In this case, the temperature in the gas phase has to be controlled so as to be lower than the softening point of the thermoplastic resin, and therefore it becomes difficult to sufficiently dry droplets of the toner composition liquid.

In addition, when the resin in the resin composition liquid has high affinity for the organic solvent used for the resin composition liquid, the organic solvent is adsorbed on the resin, and therefore droplets of the resin composition liquid cannot be satisfactorily dried.

In order to sufficiently dry droplets in a gas phase, it is necessary to enlarge the chamber 61 (illustrated in FIG. 9) to prolong the flight duration of the droplets 21 in the chamber while raising the drying temperature to increase the diffusion speed of the organic solvent included in the droplets. When the drying temperature is raised, it is necessary to feed cold air to the particle collecting portion to lower the temperature of the resultant particles. When the chamber is enlarged and/or the cold air feeding device is provided, a problem in that the production costs of the particulate material increase is caused.

Figure 16:
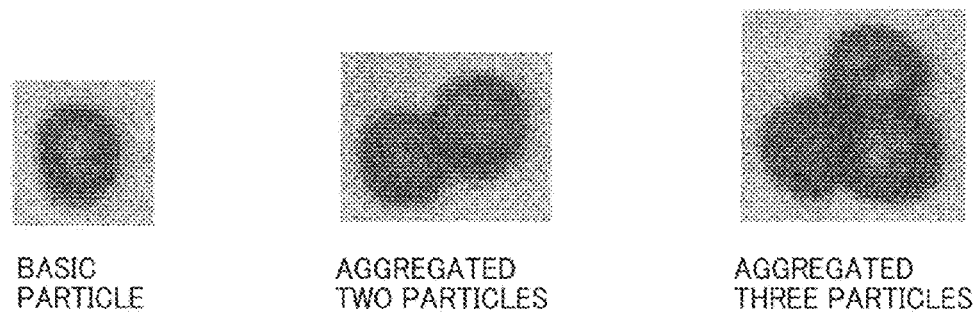
FIG. 16 is photographs of a basic particle and aggregated particles taken by a flow particle image analyzer.

In the particulate material production method of this disclosure, collection of particles is performed in a poor solvent. By using this method, the particles are dispersed in the poor solvent even when the particles are insufficiently dried, and therefore the particles are not contacted with each other over a long period of time, thereby preventing formation of such aggregated particles as illustrated in FIG. 16.

In addition, the organic solvent included in the particulate material composition liquid is mixable with the poor solvent, the organic solvent in the gas phase can be removed by the poor solvent to an extent such that the concentration of the organic solvent in the gas phase becomes on the ppm order. Particularly, when an organic solvent having a high solubility in the poor solvent is used for the particulate material composition liquid, the organic solvent can be highly efficiently removed from the particles.

This particulate material production method of this disclosure relates to a method for producing a particulate material such as toner. Hereinafter, description will be made by reference to toner (toner production method), but various particulate materials can be produced by this method by selecting proper materials for the particulate materials.

The toner produced by the particulate material production method includes at least a resin, and optionally includes other components such as colorants, waxes, charge controlling agents, and additives.

Initially, the toner composition liquid used for the toner production method will be described. The toner composition liquid is a liquid in which the above-mentioned toner components are dissolved or dispersed.

The toner components are not particularly limited as long as a toner composition liquid can be prepared by using the components, and any known components for use in conventional electrophotographic toner can be used. By ejecting droplets of the toner composition liquid by the above-mentioned droplet ejecting device, and solidifying the droplets while collecting the particles using the above-mentioned solidifying and collecting device, toner particles can be produced.

The toner includes a resin as a binder. The resin is not particularly limited, and any known resins for use in conventional toner can be used. Specific examples of such resins include homopolymers and copolymers of vinyl compounds such as styrene compounds, acrylic compounds, and methacrylic compounds; polyester resins, polyol resins, phenolic resins, silicone resins, polyurethane resins, polyamide resins, furan resins, epoxy resins, xylene resins, terpene resins, coumarone-indene resins, polycarbonate resins, and petroleum resins.

The resin included in the toner is preferably dissolved in an organic solvent, and other properties of the resin may be the same as those of resins for use in conventional toner.

The resin preferably has a molecular weight distribution such that in the molecular weight distribution curve obtained by subjecting the tetrahydrofuran (THF)-soluble components of the resin to gel permeation chromatography (GPC), at least one peak is present in a molecular weight range of from 3,000 to 50,000, and more preferably from 5,000 to 20,000. In this case, the resultant toner has a good combination of fixability and offset resistance. In addition, the THF-soluble components of the resin preferably include components having molecular weights of not greater than 100,000 in an amount of from 60 to 100%.

The binder resin included in the toner composition liquid preferably includes a resin having an acid value of from 0.1 to 50 mgKOH/g in an amount of not less than 60% by weight. In this regard, the acid value is measured by the method described in JIS K-0070.

Crystalline resins, non-crystalline resins and combinations of a crystalline resin and a non-crystalline resin can be used for the binder resin.

A crystalline resin has a thermal property such that the ratio (S/P) of the softening point (S) of the resin, which is measured by a flow tester, to the maximum peak temperature (P) thereof determined by a differential scanning calorimeter (DSC) is from 0.80 to 1.55. Specifically, when a crystalline resin is heated, the resin is sharply softened around the softening point.

In contrast, a non-crystalline resin has a ratio (S/P) of the softening point (S) to the maximum peak temperature (P) of greater than 1.55. Specifically, when a non-crystalline resin is heated, the resin is gradually softened in a temperature range including the softening point.

The softening point of a resin can be measured by a flow tester such as CFT-500D from Shimadzu Corporation. In this specification, the softening point of a resin is measured by the following method.

One gram of a resin is heated at a temperature rising speed of 6° C./min while applying a load of 1.96 MPa to the resin using a plunger to extrude the resin from a nozzle having a diameter of 1 mm and a length of 1 mm when the resin is softened. A graph showing the relationship between the temperature and the amount of descent of the plunger is drawn to determine the temperature (i.e., softening point of the resin) at which half of the resin is flown out of the nozzle.

The crystalline resin for use in the toner composition liquid is not particularly limited as long as the resin has crystallinity. Specific examples thereof include polyester resins, polyurethane resins, polyurea resins, polyamide resins, polyether resins, vinyl resins, and modified crystalline resins. These can be used alone or in combination. Among these crystalline resins, polyester resins, polyurethane resins, polyurea resins, polyamide resins, and polyether resins are preferable, and resins having at least one of a urethane skeleton and a urea skeleton are more preferable. Further, linear polyester resins, and complex resins including a linear polyester resin are even more preferable. Specific examples of the resins having at least one of a urethane skeleton and a urea skeleton include polyurethane resins, polyurea resins, urethane-modified polyester resins, and urea-modified polyester resins.

Urethane-modified polyester resins are resins obtained by reacting a polyester resin having an isocyanate group at the end thereof with a polyol, and urea-modified polyester resins are resins obtained by reacting a polyester resin having an isocyanate group at the end thereof with an amine.

The toner of this disclosure can include a magnetic material. Known magnetic materials for use in conventional toners can be used. Specific examples thereof include (1) magnetic iron oxides such as magnetite, maghemite, and ferrite, and iron oxides including another metal oxide; (2) metals such as iron, cobalt and nickel, and metal alloys of iron, cobalt or nickel with another metal such as aluminum, copper, lead, magnesium, tin, zinc, antimony, beryllium, bismuth, cadmium, calcium, manganese, selenium, titanium, tungsten and vanadium; and (3) mixtures of the materials mentioned above in paragraphs (1) and (2).

These magnetic materials can be used as colorants. The added amount of such a magnetic material is preferably from 10 to 200 parts by weight, and more preferably form 20 to 150 parts by weight, based on 100 parts by weight of the binder resin included in the toner. The number average particle diameter of such a magnetic material is preferably from 0.1 μm to 2 μm, and more preferably from 0.1 μm to 0.5 μm. The number average particle diameter of a magnetic material can be determined by analyzing a photograph of the magnetic material, which is taken by a transmission electron microscope, using a digitizer.

The toner of this disclosure can include a colorant. The colorant is not particularly limited, and any known pigments and dyes can be used. The added amount of such a colorant is preferably from 1 to 15% by weight, and more preferably from 3 to 10% by weight, based on the weight of the toner.

Master batches, which are complexes of a resin and a colorant, can be used as the colorant. The purpose of preparing a master batch is to well disperse a pigment (colorant) in a resin. Therefore, if a pigment can be dispersed in the toner composition liquid, it is not necessary to prepare a master batch. A master batch is typically prepared by applying a shear force to a mixture of a pigment and a resin to well disperse the pigment in the resin. One or more of any known resins can be used as the resin, which is used for preparing a master batch and/or which is mixed with a master batch to prepare the toner composition liquid.

The added amount of such a master batch in the toner is preferably from 0.1 to 20 parts by weight based on 100 parts by weight of the binder resin included in the toner.

A dispersant can be used when preparing a master batch. Any known dispersants can be used, but in order to well disperse a pigment in a resin, dispersants having good compatibility with the binder resin used are preferably used. Specific examples of marketed products of such dispersants include AJISPERs PB821 and PB822 from Ajinomoto-Fine-Techno Co., Ltd; DISPERBYK 2001 from BYK Chemie GmbH; and EFKA 4010 from BASF.

The added amount of such a dispersant in the toner is preferably from 1 to 200 parts by weight, and more preferably from 5 to 80 parts by weight, based on 100 parts by weight of the colorant included in the toner. When the added amount is less than 1 part by weight, good pigment dispersing effect is hardly produced. In contrast, when the added amount is greater than 200 parts by weight, the charging property of the toner tends to deteriorate under high humidity conditions.

The toner composition liquid for use in the particulate material production method and apparatus can include a wax as well as a binder resin and a colorant. Specific examples thereof include aliphatic hydrocarbon waxes such as low molecular weight polyethylene, low molecular weight polypropylene, polyolefin waxes, microcrystalline waxes, paraffin waxes, and Sasol waxes; oxidized materials of aliphatic hydrocarbon waxes or block copolymers of the materials such as oxidized polyethylene waxes; vegetable waxes such as candelilla waxes, carnauba waxes, Japan waxes, and jojoba waxes; animal waxes such as bees waxes, lanolin and whale waxes; mineral waxes such as ozocerite, ceresine and petrolatum; waxes including fatty acid esters as main components such as montanic acid ester waxes, and caster waxes; and partially or entirely deoxidized fatty acid esters such as deoxidized carnauba waxes.

The wax to be included in the toner preferably has a melting point of form 70 to 140° C., and more preferably from 70 to 120° C., so that the fixability of the toner and the offset resistance thereof are balanced. When the melting point is not lower than 70° C., good blocking resistance can be imparted to the toner. The melting point is not higher than 140° C., good offset resistance can be imparted to the toner.

The total amount of waxes in the toner is preferably from 0.2 to 20 parts by weight, and more preferably from 0.5 to 10 parts by weight, based on 100 parts by weight of the binder resin included in the toner.

The melting point of a wax is defined as the temperature at which the maximum endothermic peak of the DSC (differential scanning calorimetry) curve of the wax has a peak top.

The DSC measuring instrument used for measuring the melting point of a wax or a toner is preferably a high-precision internally-heated input compensation type differential scanning calorimeter. ASTM D3418-82 is used as the measuring method. The DSC curve used for determining the melting point is obtained by heating a sample at a temperature rising speed of 10° C./min after the sample is preliminarily heated and then cooled to delete history from the sample.

The organic solvent included in the toner composition liquid is not particularly limited as long as the solvent can dissolve the binder resin used while well dispersing the colorant and the release agent used. When toner particles prepared by a particulate material production apparatus are collected by such a cyclone 62 as illustrated in FIG. 9, the organic solvent included in the ejected droplets is preferably dried to some extent in the gas phase in the chamber 61, and therefore an organic solvent, which can be easily evaporated, is preferably used for the toner composition liquid. Therefore, the organic solvent included in the toner composition liquid preferably has a boiling point of not higher than 100° C.

Suitable materials for use as the organic solvent include ethers, ketones, esters, hydrocarbons and alcohols. Among these organic solvents, tetrahydrofuran (THF), acetone, methyl ethyl ketone (MEK), ethyl acetate, and toluene are preferable. These solvents can be used alone or in combination.

In the particulate material production method and apparatus of this disclosure, the organic solvent included in the droplets (toner particles) is preferably removed therefrom by the poor solvent used for the particulate material production method and apparatus. Therefore, the organic solvent used for the toner composition liquid preferably has a high solubility in the poor solvent used, which hardly dissolves the toner composition. When the organic solvent in the droplets (toner particles) is dissolved in the poor solvent, removal of the organic solvent from the toner particles can be efficiently performed. Specific examples of such organic solvents include acetone, methyl ethyl ketone, and ethyl acetate.

The poor solvent for use in the particulate material production method and apparatus of this disclosure is not particularly limited as long as components of the toner composition (particulate material composition) are insoluble in the solvent. From the viewpoints of solubility of components of the toner composition in the poor solvent and compatibility of the poor solvent with organic solvents, hydrocarbons, alcohols and water are preferably used as the poor solvent, and n-hexane, methanol and ethanol are more preferable. These solvents can be used alone or in combination.

Particularly, when the resin of the toner composition is a resin such as polymers of vinyl monomers (e.g., styrene-based monomers, acrylic monomers, and methacrylic monomers), copolymers of the vinyl monomers; polyester resins, polyol resins, polyurethane resins, and polyamide resins, water and ethanol are preferably used as the poor solvent.

When the resin of the toner composition is a resin such as polymers of vinyl monomers (e.g., styrene-based monomers, acrylic monomers, and methacrylic monomers), copolymers of the vinyl monomers; polyester resins, polyol resins, polyurethane resins, and polyamide resins, methyl ethyl ketone, and ethyl acetate are preferably used as the organic solvent included in the toner composition liquid, and water and ethanol are preferably used as the poor solvent.

The solid content of the toner composition liquid (particulate material composition liquid) is not particularly limited as long as the liquid can satisfactorily form droplets. However, the solid content is preferably not greater than 30% by weight, and more preferably from 5 to 20% by weight.

In order to protect the electrostatic latent image bearing member and carrier used for image forming apparatus for which the toner is used, to enhance the cleaning property and the fixing rate of the toner, and to adjust the thermal property, the electric property, the physical property, the resistance, and the softening point of the toner, the toner can include other additives if desired. Specific examples of such additives include various metal soaps, fluorine-containing surfactants, dioctyl phthalate, electroconductivity imparting agents (such as tin oxide, zinc oxide, carbon black and antimony oxide), and particulate inorganic materials (such as titanium oxide, aluminum oxide, alumina and silica). In this regard, the particulate inorganic materials may be hydrophobized if desired. In addition, lubricants such as polytetrafluoroethylene, zinc stearate and polyvinylidene fluoride, abrasives such as cesium oxide, silicon carbide and strontium titanate, and caking preventing agents can also be added in a small amount. Further, small amounts of white particulate materials and black particulate materials, which have a charge having a polarity opposite to that of the toner, can be used as development improving agents.

It is also preferable that the surfaces of these additives are treated with one or more of treatment agents such as silicone varnishes, various modified silicone varnishes, silicone oils, various modified silicone oils, silane coupling agents, silane coupling agents having a functional group, and other organic silicon compounds to control the charge quantity of the toner.

Particulate inorganic materials are preferably used as the additives (i.e., external additives). Specific examples thereof include known particulate inorganic materials such as silica, alumina and titanium oxide.

In addition, particulate polymers (such as polystyrene, copolymers of methacrylates, and copolymers of acrylates), which are prepared by soap free emulsion polymerization methods, suspension polymerization methods, and dispersion polymerization methods; and particulate polycondensation polymers and particulate thermosetting resins such as silicone resins, benzoguanamine resins, and nylons can be used as the external additives.

These external additives can be treated with a surface treatment agent to enhance the hydrophobicity thereof, thereby preventing deterioration of the additives themselves under high humidity conditions. Specific examples of such a surface treatment agent include silane coupling agents, silylating agents, silane coupling agents having a fluorinated alkyl group, organic titanate coupling agents, aluminum coupling agents, silicone oils, and modified silicone oils.

The external additives preferably have a primary particle diameter of form 5 nm to 2 µm, and more preferably from 5 nm to 500 nm. The BET specific surface area thereof is preferably from 20 to 500 m²/g. The added amount of such a particulate inorganic material is preferably from 0.01 to 5% by weight, and more preferably from 0.01 to 2.0% by weight, based on the weight of the toner.

Specific examples of the cleanability improving agent, which is added to the toner to easily remove toner particles remaining on an electrostatic latent image bearing member and a primary transfer medium even after the toner image thereon is transferred, include fatty acids and metal salts of fatty acids such as zinc stearate, calcium stearate, and stearic acid; and particulate polymers, which are prepared by soap free emulsion polymerization methods, such as particulate polymethyl methacrylate, and particulate polystyrene. The particulate polymers preferably have a relatively narrow particle diameter distribution, and a volume average particle diameter of from 0.01 µm to 1 µm.

Next, the developer including the toner of this disclosure will be described.

The developer includes at least the toner mentioned above and optionally includes another component such as carrier. Namely, the developer may be a one-component developer including no carrier or a two-component developer including a carrier. When the developer is used for high speed printers, which can be used for recent high-speed information processing systems, a two-component developer is preferably used because of having a relatively long life. The one-component developer may be a magnetic one-component developer including a magnetic metal or a non-magnetic one-component developer including no magnetic metal.

When the toner mentioned above is used for the one-component developer, the average particle diameter of toner particles in a developing device hardly varies even when part of the toner particles in the developing device is used for development and new toner particles are supplied to the developing device to compensate for the toner particles used for development. In addition, the developer hardly causes a toner filming problem such that a film of the toner is formed on a developing roller, and therefore the developing roller cannot satisfactorily scrape (draw up) the toner, resulting in formation of a low density image, or a toner adhesion problem such that the toner is adhered to a toner regulating member (such as a blade) to form a thin layer of the toner on the surface of a developing roller. Further, even when the developer is used for a developing device over a long period of time while agitated in the developing device, the developer can maintain good developing ability and can produce high quality images.

When the toner mentioned above is used for the two-component developer, the average particle diameter of toner particles in the developer in a developing device hardly varies even when part of the toner particles in the developer is used for development and new toner particles are supplied to the developer in the developing device to compensate for the toner particles used for development. In addition, even when the two-component developer is agitated in a developing device over a long period of time, the developer can maintain good developing ability and can produce high quality images.

Next, the carrier for use in the two-component developer will be described. A carrier including a core and a resinous cover layer located on the surface of the core is preferably used.

The core is not particularly limited, and any known magnetic materials can be used. Among these magnetic materials, manganese-strontium based magnetic materials, and manganese-magnesium based magnetic materials, which have a magnetization of from 50 to 90 emu/g (0.05 to 0.09 A·m²/g) are preferably used. In order to produce high density images, magnetic materials having a relatively high magnetization such as iron (which has a magnetization of not less than 100 emu/g (0.100 A·m²/g)), and magnetite (which has a magnetization of from 75 to 120 emu/g (0.075 to 0.120 A·m²/g)) are preferably used. In order to weakly contact a magnetic brush of the developer with a photoreceptor (i.e., in order to produce high quality images), magnetic materials having a relatively low magnetization such as copper-zinc based magnetic materials (which have a magnetization of from 30 to 80 emu/g (0.03 to 0.08 A·m²/g)) are preferably used. These magnetic materials can be used alone or in combination.

The core preferably has a weight average particle diameter (D50) of from 10 μm to 200 μM, and preferably from 40 μm to 100 μm. When the weight average particle diameter is less than 10 μm, the core has a particle diameter distribution such that the percentage of fine particles increases, and therefore a carrier scattering problem such that carrier particles in the two-component developer are scattered around a developing device, thereby contaminating parts and devices in the vicinity of the developing device tends to be caused because the magnetization of the carrier per one particle decreases. In contrast, if the weight average particle diameter is greater than 200 μm, the specific surface area of the carrier decreases, thereby causing a toner scattering problem such that toner particles in the two-component developer are scattered around a developing device, thereby contaminating parts and devices in the vicinity of the developing device. In addition, when such a large carrier is used for a full color developer, reproducibility of a solid image tends to deteriorate.

Specific examples of the resin for use in the resinous cover layer of the carrier include amino resins, vinyl resins, styrene resins, halogenated olefin resins, polyester resins, polycarbonate resins, polyethylene resins, polyvinyl fluoride resins, polyvinylidene fluoride resins, polytrifluoroethylene resins, polyhexafluoropropylene resins, copolymers of vinylidene fluoride-acrylic monomer, vinylidene fluoride-vinyl fluoride copolymers, fluoro-terpolymers of tetrafluoroethylene, vinylidene fluoride and a monomer including no fluorine atom, and silicone resins. These resins can be used alone or in combination. Among these resins, silicone resins are preferable.

The silicone resin for use in the resinous cover layer is not particularly limited, and any known silicone resins can be used. Specific examples thereof include straight silicone resins constituted of only an organo siloxane bond; and modified silicone resins modified by an alkyd resin, a polyester resin, an epoxy resin, an acrylic resin, or a urethane resin.

Specific examples of marketed products of the straight silicone resins include KR271, KR255 and KR152 from Shin-Etsu chemical Co., Ltd.; and SR2400, SR2405 and SR2410 from Dow Corning Toray Silicone Co., Ltd.

Specific examples of marketed products of the modified silicone resins include KR206 (alkyd-modified silicone resins), KR5208 (acrylic-modified silicone resins), ES1001N (epoxy-modified silicone resins), and KR305 (urethane-modified silicone resins) from Shin-Etsu chemical Co., Ltd.; and SR2115 (epoxy-modified silicone resins), and SR2110 (alkyd-modified silicone resins) from Dow Corning Toray Silicone Co., Ltd.

Silicone resins can be used alone, or in combination with another component such as crosslinking agents, and charge controlling agents.

The resinous cover layer can include a particulate electroconductive material such as metal powders, carbon blacks, titanium oxide, tin oxide, and zinc oxide. The average particle diameter of such a particulate electroconductive material is preferably not greater than 1 μm. When the average particle diameter is greater than 1 μm, it often becomes difficult to control the electric resistance of the resinous cover layer.

The resinous cover layer is typically prepared by coating the surface of a core with a coating liquid, which is prepared by dissolving a resin such as silicone resins in a solvent, and then drying the coated coating liquid, followed by baking of the coated layer. Specific examples of the coating method include dip coating methods, spray coating methods, and brush coating methods.

The solvent used for the coating liquid is not particularly limited. Specific examples of the solvent include toluene, xylene, methyl ethyl ketone, methyl isobutyl ketone, cellosolve, and butyl acetate.

The method for baking the cover layer is not particularly limited, and an external heating method or an internal heating method can be used. Specific examples of the method include methods using a fixed electric furnace, a fluid electric furnace, a rotary electric furnace or a burner furnace, or methods using microwave.

The weight ratio of the resinous cover layer in the carrier is preferably from 0.01 to 5.0% by weight. When the weight ratio is less than 0.01% by weight, it is often difficult to form an even cover layer on a core. In contrast, when the weight ratio is greater than 5.0% by weight, the cover layer becomes too thick, aggregation of carrier particles is often caused, and it becomes difficult to prepare carrier particles having a sharp particle diameter distribution.

When the developer is a two-component developer, the weight ratio of the carrier in the developer is preferably from 90 to 98% by weight, and more preferably from 93 to 97% by weight.

In such a two-component developer, the weight ratio (T/C) of the toner (T) to the carrier (C) is preferably from $1/100$ to $10/100$.

Next, an image forming apparatus for which the toner prepared by the particulate material production method can be used will be described.

The image forming apparatus includes at least an electrostatic latent image bearing member (hereinafter referred to as an image bearing member), a charger, an irradiator, a developing device, a transferring device, and a fixing device, and optionally includes other devices such as cleaners, dischargers, recycling devices, and controllers.

The charger charges a surface of the image bearing member, and the irradiator irradiates the charged surface of the image bearing member with light to form an electrostatic latent image on the surface of the image bearing member. In this regard, the charger and the irradiator serve as an electrostatic latent image forming device.

The developing device develops an electrostatic latent image on the image bearing member with a developer including the above-mentioned toner to form a visible image (toner image) on the image bearing member. The developing device includes a rotatable developer bearing member which includes a fixed magnetic field generator inside thereof to bear the developer on the surface thereof.

The constitutional material, shape, structure, and size of the image bearing member are not particularly limited. For example, with respect to the shape, a drum-shaped, sheet-shaped, or endless-shaped image bearing member can be used. With respect to the structure, a single-layered or multi-layered image bearing member can be used. The size of the image bearing member is determined based on the size of the image forming apparatus or the specifications of the image forming apparatus. Photoreceptors are typically used for the image bearing member, and inorganic photosensitive materials such as amorphous silicon, selenium, CdS and ZnO, organic photosensitive materials such as polysilane and phthalopolymethine, or the like can be used therefor.

The charger charges a surface of the image bearing member. The charger is not particularly limited as long as the charger can apply a voltage to a surface of the image bearing member to evenly charge the surface of the image bearing member. The charger is broadly classified into (1) contact chargers to charge a surface of an image bearing member by contacting the surface; and (2) non-contact chargers to charge a surface of an image bearing member without contacting the surface.

Specific examples of the contact chargers include conductive or semi-conductive charging rollers, magnetic brushes, fur brushes, films and rubber blades. Among these contact chargers, charging rollers are preferable because the amount of ozone generated by a charging roller is much less than that generated by a charger using corona discharging, and an image bearing member can be stably charged by a charging roller even after long repeated use, thereby making it possible to prevent deterioration of image quality.

Specific examples of the non-contact chargers include chargers using corona discharging, chargers using a needle electrode, solid state discharging devices, and conductive or semi-conductive short-range charging rollers, which are arranged while forming a small gap with an image bearing member.

The irradiator irradiates the charged surface of the image bearing member with light to form an electrostatic latent image on the surface of the image bearing member. The irradiator is not particularly limited as long as the irradiator can irradiate the image bearing member with light based on image information to be recorded. Specific examples thereof include optical systems for copiers, rod lens arrays, laser optical systems, optical systems using a liquid crystal shutter, and optical systems using a LED (light emitting diode). An irradiator which irradiates an image bearing member from the backside of the image bearing member can also be used.

The developing device is not particularly limited as long as the developing device can perform development using the above-mentioned toner. For example, a developing device which contains the toner mentioned above and which can apply the toner to the image bearing member mentioned above in a contact or non-contact manner.

The developing device may be a developing device using a dry or liquid developer. In addition, the developing device may be a monochromatic developing device or a multi-color developing device.

Among various developing devices, developing devices including an agitator to agitate a developer including the toner to charge the toner, and a rotatable developer bearing member which includes a fixed magnetic field generator inside thereof to bear the developer on the surface thereof are preferably used.

In the developing device using a two-component developer, the toner and the carrier are mixed and agitated, thereby frictionally charging the toner. In addition, the developer is attracted by a magnetic roller arranged inside the rotated developer bearing member, and thereby a magnetic brush is formed on the surface of the developer bearing member. Since the developer bearing member is arranged in the vicinity of the image bearing member, part of the toner in the magnetic brush is electrostatically adhered to the electrostatic latent image on the image bearing member, thereby forming a toner image on the image bearing member.

Figure 17:
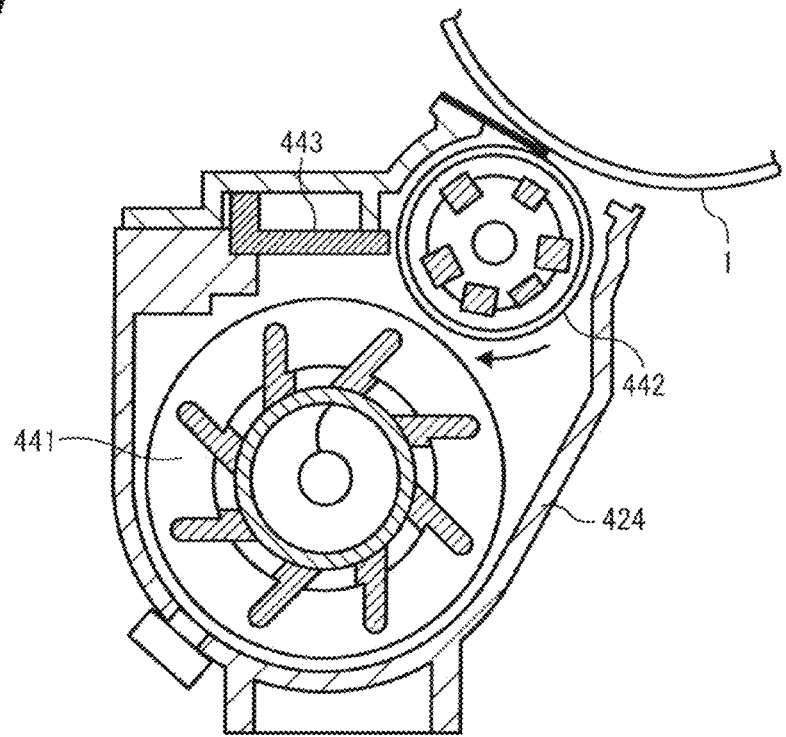
FIG. 17 is a schematic view illustrating a two-component developing device for which toner produced by the particulate material production method can be used.

FIG. 17 illustrates a developing device using a two-component developer including the toner and a magnetic carrier. In the developing device, the developer is agitated and fed by a screw 441 toward a developing sleeve 442 serving as a developer bearing member. The developer fed to the developing sleeve 442 is regulated by a doctor blade 443 serving as a developer layer regulating member so that the developer layer having a thickness corresponding to the gap (doctor gap) between the tip of the doctor blade and the surface of the developing sleeve. When the gap is too narrow, the amount of the developer layer on the developing sleeve is too small, and thereby low density images are formed. In contrast, when the amount of the developer layer on the developing sleeve is too large, an excess amount of developer is supplied, and thereby a carrier adhesion problem such that carrier particles in the developer are adhered to an electrostatic latent image on the image bearing member is caused. Therefore, a magnet serving as a magnetic field generator is provided inside the developing sleeve 442 to erect the developer (i.e., to form a magnetic brush) on the developing sleeve. Thus, a magnetic brush in which the developer is erected by a magnetic force on the developing sleeve 442 like a chain along the normal line of the developing sleeve is formed.

The developing sleeve 442 is arranged so as to be opposed to a photoreceptor drum 1 with a gap (development gap) therebetween so that a development region is formed between the opposed developing sleeve and photoreceptor. The developing sleeve 442 is typically a cylinder of a non-magnetic material such as aluminum, brass, stainless steel, and electroconductive resins, and is rotated by a driving device in a direction indicated by an arrow. The magnetic brush on the developing sleeve 442 is moved to the development region due to rotation of the developing sleeve. A development bias (voltage) is applied to the developing sleeve 442 by a power source (not shown) to form a development electric field between the developing sleeve and the photoreceptor drum 1 so that the toner in the developer is separated from the carrier by the development electric field, and adheres to the electrostatic latent image on the photoreceptor drum, resulting in formation of a toner image on the photoreceptor drum. The development bias is not limited to a DC voltage, and a DC voltage on which an AC voltage is superimposed can also be used.

The development gap is preferably 5 to 30 times the particle diameter of the developer. Namely, when the particle diameter of the developer (carrier) is 50 μm, the development gap is preferably from 0.25 mm to 1.5 mm. When the development gap is too large, the image density tends to decrease.

The doctor gap is preferably equal to or slightly larger than the development gap. The diameter and the linear speed of the photoreceptor drum 1, and the diameter and the linear speed of the developing sleeve 442 are determined depending on the specifications (such as copying speed) and size of the image forming apparatus. The ratio (D/P) of the linear speed (D) of the developing sleeve 442 to the linear speed (P) of the photoreceptor drum 1 is preferably not less than 1.1. A sensor can be provided on a downstream side from the developing device relative to the rotation direction of the photoreceptor drum 1 to detect the amount (weight or thickness) of toner adhered to the surface of the photoreceptor drum 1 using optical reflection of the toner image to control the image forming conditions based on the detection results.

In FIG. 17, numeral 424 denotes a casing of the developing device.

The transferring device transfers the toner image on the image bearing member to a recording medium. The transferring device is broadly classified into direct transferring devices to directly transfer the toner image on the image bearing member to a recording medium, and indirect transferring devices to primarily transfer the toner image on the image bearing member to an intermediate transfer medium, followed by secondarily transferring the toner image onto a recording medium. The transferring device is not particularly limited, and a proper transferring device is selected from these direct transferring devices and indirect transferring devices.

The fixing device fixes the toner image to the recording medium. The fixing device is not particularly limited, and fixing devices including a fixing member, and a heater to heat the fixing member are preferably used.

The fixing member is not particularly limited as long as the fixing member can form a fixing nip. For example, combinations of an endless belt and a roller, and combinations of a roller and a roller can be used for the fixing member. Among these fixing members, combinations of an endless belt and a roller are preferable because the warm-up time can be shortened, and energy can be saved. In addition, a method in which the surface of such a fixing member is heated by induction heating is also preferably used because energy can be saved.

The fixing device is broadly classified into the following two types.

(1) fixing devices in which at least one of a roller and a belt is used as a fixing member, and the fixing member is heated from inside (i.e., from the side not contacting toner) to heat the toner image on the recording medium upon application of pressure thereto (i.e., fixing devices using an internal heating method); and (2) fixing devices in which at least one of a roller and a belt is used as a fixing member, and the fixing member is heated from outside (i.e., from the side contacting toner) to heat the toner image on the recording medium upon application of pressure thereto (i.e., fixing devices using an external heating method)

Fixing devices using both the internal heating method and the external heating method can also be used.

Specific examples of the fixing devices (1) include fixing devices having a fixing member, and a heating device (such as heaters and halogen lamps) arranged inside the fixing member.

Specific examples of the fixing devices (2) include fixing devices having a fixing member, and a heating device, wherein at least part of the surface of the fixing member (i.e., at least one of a roller and a belt) is heated by the heating device. In this regard, the heating device is not particularly limited, and electromagnetic induction heaters can be used. The electromagnetic induction heater is not particularly limited, and heaters including a member to generate a magnetic field and a member to generate heat using electromagnetic induction can be preferably used.

Suitable electromagnetic induction heaters include heaters including an induction coil, which is formed on a shielding layer and which is arranged in the vicinity of a fixing member (such as a heat roller), an insulating layer formed on the opposite side of the shielding layer. In this case, it is preferable that the heat roller serving as a fixing member is made of a magnetic material or the roller is a heat pipe. In addition, it is preferable that the induction coil is arranged so as to be opposed to a half cylinder portion of the heat roller located on a side opposite to the contact portion of the heat roller with a fixing member such as a pressure roller and an endless belt.

Next, a process cartridge to which the toner prepared by the particulate material production method of this disclosure can be used will be described.

The process cartridge includes at least an image bearing member to bear an electrostatic latent image thereon, and a developing device to develop the electrostatic latent image with a developer including the toner mentioned above to form a toner image on the image bearing member, and optionally includes other devices such as chargers, irradiators, transferring devices, cleaners and dischargers.

The developing device includes at least a toner container to contain the toner mentioned above, and a toner bearing member to bear and feed the toner in the toner container, and optionally includes a toner layer regulating member to control the thickness of the toner layer on the toner bearing member. The developing device preferably includes at least a developer container to contain a two-component developer including a carrier and the toner mentioned above, and a developer bearing member to bear and feed the developer in the developer container. Specifically, the above-mentioned developing device is preferably used.

The above-mentioned chargers, irradiators, and transferring devices can be used for the optional charger, irradiator and transferring device, respectively. In addition, any known cleaners and dischargers for use in electrophotographic image forming apparatuses can be used for the optional cleaner and discharger.

The process cartridge can be detachably attachable to electrophotographic image forming apparatuses such as copiers, facsimiles, and printers.

Figure 18:
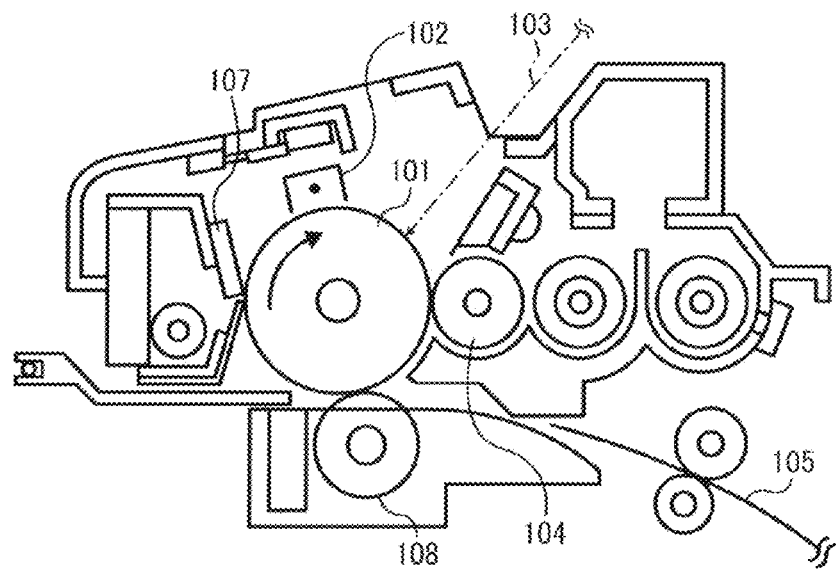
FIG. 18 is a schematic view illustrating a process cartridge for which toner produced by the particulate material production method can be used.

FIG. 18 illustrates an example of the process cartridge. The process cartridge includes an image bearing member 101, a charger 102, a developing device 104, and a transferring device 108, a cleaner 107. The process cartridge can optionally include other devices if necessary. In FIG. 18, numeral 103 denotes a light beam emitted by an irradiator, and numeral 105 denotes a recording medium.

The image forming process of the process cartridge illustrated in FIG. 18 is as follows. The image bearing member 101, which is rotated in a direction indicated by an arrow, is charged by the charger 102, and then irradiated by the light beam 103, thereby forming an electrostatic latent image on the surface thereof. The electrostatic latent image is developed with the toner using the developing device to form a toner image on the image bearing member 101. The toner image is transferred onto the recording medium 105 by the transferring device 108. After the toner image is fixed to the recording medium 105 by a fixing device of the image forming apparatus to which the process cartridge is attached, the surface of the image bearing member 101 is cleaned by the cleaner 107, and then discharged by a discharger (not shown) so that the image bearing member is ready for the next image forming process.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of Non-Crystalline Resin 1

The following components were contained in a reaction vessel equipped with a condenser, an agitator and a nitrogen feed pipe to perform a reaction for 8 hours at 230° C. under normal pressure.

| | |
|---|---|
| Ethylene oxide adduct (2 mole) of bisphenol A | 229 parts |
| Propylene oxide adduct (2 mole) of bisphenol A | 529 parts |
| Terephthalic acid | 208 parts |
| Adipic acid | 46 parts |
| Dibutyl tin oxide | 2 parts |

The reaction was further continued for 5 hours under a reduced pressure of from 10 mmHg to 15 mmHg (1333 Pa to 2000 Pa). Next, 44 parts of trimellitic anhydride was added thereto and the mixture was reacted for 4 hours at 180° C. under normal pressure. Thus, a non-crystalline polyester resin 1 was prepared.

It was confirmed that the non-crystalline polyester resin 1 has a number average molecular weight (Mn) of 8,300, a weight average molecular weight (Mw) of 45,000, a glass transition temperature (Tg) of 59° C., and an acid value of 25 mgKOH/g.

Preparation of Crystalline Resin 1

The following components were contained in a reaction vessel equipped with a condenser, an agitator and a nitrogen feed pipe to perform a reaction for 8 hours at 180° C. under a nitrogen gas flow while removing generated water from the vessel.

| | |
|---|---|
| Sebacic acid | 241 parts |
| Adipic acid | 31 parts |
| 1,4-Butanediol | 164 parts |
| Titanium dihydroxybis (triethanolaminate) | 0.75 parts |

(Condensation Catalyst)

The reaction product was gradually heated to 225° C. under a nitrogen gas flow while removing generated water and remaining 1,4-butanediol to perform a reaction for 4 hours. The reaction was further continued under a reduced pressure of from 5 mmHg to 20 mmHg (667 Pa to 2667 Pa) until the reaction product had a weight average molecular weight (Mw) of 18,000. Thus, a crystalline resin 1 was prepared. It was confirmed that the crystalline resin 1 has a melting point of 58° C.

Preparation of Non-Crystalline Resin Solution

The following components were fed into a reaction vessel equipped with a thermometer and an agitator.

| | |
|---|---|
| Non-crystalline resin 1 prepared above | 10 parts |
| Ethyl acetate | 90 parts |

The mixture was agitated to prepare a non-crystalline resin solution 1.

Preparation of Crystalline Resin Solution

The following components were fed into a reaction vessel equipped with a thermometer and an agitator.

| | |
|---|---|
| Crystalline resin 1 prepared above | 10 parts |
| Ethyl acetate | 90 parts |

The mixture was agitated at 70° C. to prepare a crystalline resin solution 1.

Preparation of Polyester Resin Solution

The following components were fed into a container.

| | |
|---|---|
| Polyester resin (Number average molecular weight of 8,300, weight average molecular weight of 45,000, and glass transition temperature of 59° C.) | 10 parts |
| Ethyl acetate | 90 parts |

The mixture was mixed to prepare a polyester resin solution 1.

Preparation of Colorant Dispersion

The following components were subjected to a primary dispersing treatment using an agitator having a blade to prepare a primary dispersion.

| | |
|---|---|
| Carbon black (REGAL 400 from Cabot Corporation) | 20 parts |
| Dispersant (AJISPER PB821 from Ajinomoto-Fine-Techno Co., Ltd.) | 2 parts |

The primary dispersion was subjected to a secondary fine dispersing treatment using a DYNO-MILL mill (from Sinmaru Enterprises Corporation) while applying a strong shear force to the dispersion to prepare a secondary dispersion in which aggregates of the carbon black were not present. Further, the secondary dispersion was filtered using a polytetrafluoroethylene filter having openings of 1 μm to prepare a colorant dispersion in which submicron carbon black particles are dispersed.

Preparation of Carnauba Wax Dispersion

The following components were fed into a container.

| | |
|---|---|
| Carnauba wax (from TOAKASEI CO., LTD.) | 1 part |
| Ethyl acetate | 4 parts |

After the mixture was heated to 85° C., the mixture was agitated for 20 minutes to prepare a carnauba wax solution. The carnauba wax solution was rapidly cooled to form a carnauba wax dispersion in which fine particles of the carnauba wax are precipitated in ethyl acetate. The carnauba wax dispersion was subjected to a dispersing treatment using a bead mill, STAR MILL LMZ06 from Ashizawa Finetech Ltd. using zirconia beads with a diameter of 0.1 mm while applying a strong shear force to the dispersion. Thus, a carnauba wax dispersion including particles of the carnauba wax with an average particle diameter of 0.3 μm and a maximum particle diameter of not greater than 0.8 μm was prepared. In this regard, the particle diameter was measured with an instrument, MICROTRACK UPA 150 from NIKKISO CO., LTD.

Preparation of Toner Composition Liquid

Preparation of Toner Composition Liquid 1

The following components were mixed in a container.

| | |
|---|---|
| Non-crystalline resin solution 1 prepared above | 1000 parts |
| Colorant dispersion prepared above | 25 parts |
| Carnauba wax dispersion prepared above | 50 parts |
| Ethyl acetate | 80 parts |

The mixture was filtered using a filter having openings of 1 μm to prepare a toner composition liquid 1 having a solid content of 10%.

Preparation of Toner Composition Liquid 2

The following components were mixed in a container.

| | |
|---|---|
| Polyester resin solution 1 prepared above | 1000 parts |
| Colorant dispersion prepared above | 25 parts |
| Carnauba wax dispersion prepared above | 50 parts |
| Ethyl acetate | 80 parts |

The mixture was filtered using a filter having openings of 1 μm to prepare a toner composition liquid 2 having a solid content of 10%.

Example 1

A toner was prepared using the toner composition liquid 1 and the toner production apparatus illustrated in FIG. 9.

The size and conditions of the devices of the toner production apparatus were as follows.

1. Drying and Collecting Unit 60

The inner diameter and the height of the chamber 61 were 400 mm, and 2,000 mm, respectively. The chamber 61 was set vertically, and the upper and lower ends of the chamber were narrowed. The diameter of the upper end (i.e., carrier gas flow entrance 64) was 50 mm, and the diameter of the lower end (i.e., carrier gas flow exit 65) was also 50 mm. The droplet ejecting device of the droplet ejecting unit 2 was arranged at the center of the chamber 61, and the distance between the droplet ejecting device and the upper end of the chamber was 300 mm. Nitrogen with a temperature of 40° C. was used as the carrier gas to form the carrier gas flow, and the speed of the carrier gas flow was 10.0 m/s.

2. Liquid Column Resonance Droplet Ejecting Device

The liquid column resonance droplet ejecting device 11 illustrated in FIG. 1 was used as the droplet ejecting device of the droplet ejecting unit 2. In this regard, a liquid column resonance droplet ejecting device having a structure such that the length L between both the ends of the liquid column resonance chamber 18 in the longitudinal direction thereof is 1.85 mm, an N=2 resonance mode is used, and the first to fourth ejection nozzles 19 having a diameter of 10.0 μm are located in a region in which the N=2 mode pressure standing wave has an antinode was used.

Further, a function generator WF1973 from NF Corporation was used as a drive signal generator, and was connected with a vibration generating device 20 using a lead wire covered with polyethylene. In this regard, the drive frequency was 340 kHz so as to be matched with the liquid column resonance frequency.

The toner production method is as follows.

Droplets of the toner composition liquid 1 prepared above were continuously ejected from the liquid column resonance droplet ejecting device 11 for 1 hour. The ejected droplets were dried in the chamber 61 to some extent, and semi-dried toner particles were collected by the particle collecting device 62 (i.e., cyclone) in which 1 kg of ethanol serving as a poor solvent is contained. The toner particles in ethanol were filtered, and the filtered cake was dried. Thus, toner particles (i.e., toner 1) were prepared.

It was confirmed that the toner 1 has a volume average particle diameter (Dv) of 4.99 μm, a number average particle diameter (Dn) of 4.85 μm, a Dv/Dn ratio of 1.03, and an aggregation rate of 1.2%. In addition, the amount of ethyl acetate remaining in the toner 1 was 34 ppm. The methods for measuring the aggregation rate and the amount of residual ethyl acetate are mentioned later.

Example 2

The procedure for preparation of the toner 1 in Example 1 was repeated except that the toner production apparatus illustrated in FIG. 11 was used. The size and conditions of the devices of the toner production apparatus were as follows.

In the toner production apparatus illustrated in FIG. 11, a plate having an angle of 45°, and a width of 5 cm was used for the poor solvent flowing plate, and the poor solvent was flown at a flow rate of 2 liters per hour. The distance between the nozzles of the droplet ejecting device of the droplet ejecting unit 2 and the poor solvent flowing plate was 2 mm. In this regard, the droplet ejecting device was the same as that used in Example 1.

Similarly to the toner production method in Example 1, droplets of the toner composition liquid 1 were continuously ejected by the droplet ejecting device of the droplet ejecting unit 2, so that the droplets were collected by ethanol (poor solvent) flown along the poor solvent flowing plate. The toner particles in ethanol were filtered, and the filtered cake was dried. Thus, toner particles (i.e., toner 2) were prepared.

It was confirmed that the toner 2 has a volume average particle diameter (Dv) of 4.85 μm, a number average particle diameter (Dn) of 4.83 μm, a Dv/Dn ratio of 1.00, and an aggregation rate of 0.0%. In addition, the amount of ethyl acetate remaining in the toner 2 was 38 ppm.

Example 3

The procedure for preparation of the toner 1 in Example 1 was repeated except that a toner composition liquid 3, which is the same as the toner composition liquid 1 except that 1000 parts of the non-crystalline resin solution 1 was replaced with 800 parts of the non-crystalline resin solution 1 and 200 parts of the crystalline resin solution 1, was used. Thus, a toner 3 was prepared.

It was confirmed that the toner 3 has a volume average particle diameter (Dv) of 5.02 μm, a number average particle diameter (Dn) of 4.90 μm, a Dv/Dn ratio of 1.02, and an aggregation rate of 0.8%. In addition, the amount of ethyl acetate remaining in the toner 3 was 30 ppm.

Example 4

The procedure for preparation of the toner 2 in Example 2 was repeated except that the toner composition liquid 3, which is the same as the toner composition liquid 1 except that 1000 parts of the non-crystalline resin solution 1 was replaced with 800 parts of the non-crystalline resin solution 1 and 200 parts of the crystalline resin solution 1, was used. Thus, a toner 4 was prepared.

It was confirmed that the toner 4 has a volume average particle diameter (Dv) of 5.02 μm, a number average particle diameter (Dn) of 4.96 μm, a Dv/Dn ratio of 1.01, and an aggregation rate of 0.0%. In addition, the amount of ethyl acetate remaining in the toner 4 was 20 ppm.

Comparative Example 1

The procedure for preparation of the toner 1 in Example 1 was repeated except that the poor solvent (ethanol) was not used. Specifically, collected toner particles were spread on a tray so that the toner particles have a thickness of about 5 mm. The tray containing the collected toner particles was set in a chamber heated to 35° C. for three days (72 hours) so as to be subjected to secondary drying. Thus, a comparative toner 1 was prepared.

It was confirmed that the comparative toner 1 has a volume average particle diameter (Dv) of 5.32 μm, a number average particle diameter (Dn) of 4.91 μm, a Dv/Dn ratio of 1.08, and an aggregation rate of 5.8%. In addition, the amount of ethyl acetate remaining in the comparative toner 1 was 680 ppm.

Example 5

The procedure for preparation of the toner 1 in Example 1 was repeated except that the toner composition liquid 1 was replaced with the toner composition liquid 2 prepared above, and the poor solvent (1 kg of ethanol) was replaced with 1 kg of pure water, which included 5 g of a surfactant DRYWEL from Fuji Photo Film Co., Ltd.

Air of 35° C. was fed for 1 hour to the surface of the poor solvent containing toner particles therein to remove the organic solvent (ethyl acetate). Thereafter, the toner particles were washed with water, and then filtered, followed by drying. Thus, about 100 g of toner particles (toner 5) were prepared.

It was confirmed that the toner 5 has a volume average particle diameter (Dv) of 4.99 μm, a number average particle diameter (Dn) of 4.85 μm, a Dv/Dn ratio of 1.03, and an aggregation rate of 1.2%. In addition, the amount of ethyl acetate remaining in the toner 5 was 34 ppm.

Example 6

The procedure for preparation of the toner 2 in Example 2 was repeated except that the toner composition liquid 1 was replaced with the toner composition liquid 2 prepared above, and the poor solvent (1 kg of ethanol) was replaced with 1 kg of pure water, which included 5 g of a surfactant DRYWEL from Fuji Photo Film Co., Ltd.

Air of 35° C. was fed for 1 hour to the surface of the poor solvent containing toner particles therein to remove the organic solvent (ethyl acetate). Thereafter, the toner particles were washed with water, and then filtered, followed by drying. Thus, about 100 g of toner particles (toner 6) were prepared.

It was confirmed that the toner 6 has a volume average particle diameter (Dv) of 4.85 μm, a number average particle diameter (Dn) of 4.83 μm, a Dv/Dn ratio of 1.00, and an aggregation rate of 0.0%. In addition, the amount of ethyl acetate remaining in the toner 6 was 38 ppm.

The methods for evaluating the toners are as follows.
1. Particle Diameters, Particle Diameter Distribution, and Aggregation Rate The volume average particle diameter (Dv), the number average particle diameter (Dn), the particle diameter distribution, and the aggregation rate of each of the toners prepared above were measured using a flow type particle image analyzer, FPIA-3000 from Sysmex Corporation. Specifically, 0.5 ml of a 10% aqueous solution of a surfactant (alkylbenzene sulfonic acid salt, NEOGEN SC-A from Dai-ichi Kogyo Seiyaku Co., Ltd.) was fed into a 100 ml glass beaker, and 0.5 g of a sample (toner) was added thereto. The mixture was mixed using a micro spatula. Next, 80 ml of a sheath liquid, PARTICLE SHEATH from Sysmex Corporation, was added thereto. The mixture was subjected to a dispersing treatment using an ultrasonic dispersing machine (W-113MK-II from Honda Electronics Co., Ltd.) for 10 minutes.

A first measurement of the particle diameter distribution was performed using the flow type particle image analyzer to perform adjustment of the concentration of the sample (dispersion). When the effective analysis number (EAN) in the first measurement was greater than 14,000, the dispersion was diluted so that the effective analysis number falls in a range of from 3,500 to 14,000, and then a second measurement of the particle diameter distribution was performed. In this regard, the dilution was performed using the sheath liquid, and the dilution degree (DD) could be calculated using the following equation.

$$DD = EAN/7,000,$$

wherein EAN represents the effective analysis number obtained in the first measurement.

By diluting the sample (dispersion) at the dilution degree (DD), the effective analysis number in the second measurement could be controlled so as to fall in the range of from 3,500 to 14,000.

When the effective analysis number (EAN) was less than 3,500 in the first measurement, the toner was added to the dispersion, and the mixture was subjected to the dispersing treatment to prepare a sample for the second measurement.

The measurement conditions are as follows.
Objective lens: objective lens with 10 power magnification
Measurement mode: HPF When the effective analysis number (EAN) is less than 3,500, it is hard to reduce the measurement errors. When the effective analysis number (EAN) is greater than 14,000, the concentration of particles in the dispersion is high, and therefore a problem in that two adjacent particles are analyzed as one particle, and thereby the average particle diameter is mistakenly determined so as to be larger than the true value or the circularity of particles in the dispersion is mistakenly determined so as to be lower than the true value tends to be caused.

The particle diameter distribution of the sample was calculated using the obtained data. The volume average particle diameter (Dv) of a sample (toner) was determined based on the circle-equivalent diameter on a volume basis, and the number average particle diameter (Dn) of a sample was determined based on the circle-equivalent diameter on a number basis. The analysis conditions (particle diameter/particle shape) are as follows.

Circle-equivalent diameter: not less than 0.500 and less than 200.0
Circularity: not less than 0.200 to not greater than 1.000

The aggregation rate was measured by the following method. Such aggregated two or three particles as illustrated in FIG. 16 have lower circularity than a basic particle illustrated in FIG. 16. By changing the analysis condition (i.e., particle shape limitation: circularity), it becomes possible to count the number of aggregated particles and to determine the ratio of the number of aggregated particles to the total number of particles.

Specifically, the number of particles counted under the conditions (particle diameter/particle shape) such that the circle-equivalent diameter is not less than 0.500 and less than 200.0, and the circularity is not less than 0.200 to not greater than 1.000 is the total number of particles is the total number A of the particles, and the number of particles counted under the conditions (particle diameter/particle shape) such that the circle-equivalent diameter is not less than 0.500 and less than 200.0, and the circularity is not less than 0.200 to not greater than 0.950 is the number B of aggregated particles. Therefore, the aggregation rate (%) can be determined as (B/A)×100.

In this regard, the circularity of a particle can be measured by the flow type particle image analyzer, FPIA-3000 from Sysmex Corporation. Specifically, the analyzer determines the circularity C of a particle using the following equation:

$$C = CL2/CL1,$$

wherein CL1 represents the circumferential length of the projected image of a particle, and CL2 represents the circumferential length of a circle having the same area as the projected image of the particle. Therefore, an aggregated particle of two or more basic particles has a lower circularity than a basic particle.

2. Amount of Residual Ethyl Acetate

The amount of residual ethyl acetate was measured by thermal extraction gas chromatography mass spectrometry (GC-MS). The instruments used and the measurement conditions were as follows:

Gas chromatography mass spectrometer used: QP2010 from Shimadzu Corporation

Data analysis software used: GCMS SOLUTION from Shimadzu Corporation

Thermal extracting device: Py2020D from Frontier Laboratories Ltd.

Thermal extraction conditions:
Extraction: extraction is performed 10 minutes at 150° C.
Clarion trap: −190° C.

The evaluation results of the toners of Examples 1-6 and the comparative toner of Comparative Example 1 are shown in Table 1 below.

TABLE 1

|  | Toner | Particle diameter of toner | | | Aggregation rate (%) | Amount of residual ethyl acetate (ppm) |
|---|---|---|---|---|---|---|
|  |  | Dv (μm) | Dn (μm) | Dv/Dn |  |  |
| Example 1 | Toner 1 | 4.99 | 4.85 | 1.03 | 1.2 | 34 |
| Example 2 | Toner 2 | 4.85 | 4.83 | 1.00 | 0.0 | 38 |
| Example 3 | Toner 3 | 5.02 | 4.90 | 1.02 | 0.8 | 30 |
| Example 4 | Toner 4 | 5.02 | 4.96 | 1.01 | 0.0 | 20 |
| Example 5 | Toner 5 | 4.99 | 4.85 | 1.03 | 1.2 | 34 |
| Example 6 | Toner 6 | 4.85 | 4.83 | 1.00 | 0.0 | 38 |
| Comparative Example 1 | Comparative toner 1 | 5.32 | 4.91 | 1.08 | 5.8 | 680 |

It is clear from Table 1 that the Dv/Dn ratio of each of the toners of Examples 1-6 is close to 1.00, namely, the toners have a sharp particle diameter distribution. In addition, the aggregation rate of each of the toners of Examples 1-6 is much smaller than that of the comparative toner of Comparative Example 1. Namely, the number of aggregated particles is very small, and the toners of Examples 1-6 have a uniform particle diameter. Further, the amount of residual ethyl acetate of the toners of Examples 1-6 is very small, namely, the solvent can be satisfactorily removed from the toner.

As mentioned above, by using the particulate material production method, a particulate material having a sharp particle diameter distribution can be produced because united particles and aggregated particles are hardly produced. In addition, the resultant particulate material hardly includes a residual solvent therein.

Additional modifications and variations of the present invention are possible in light of the above teachings. It is therefore to be understood that within the scope of the appended claims the invention may be practiced other than as specifically described herein.

What is claimed is:

1. A particulate material production method comprising:
    ejecting a particulate material composition liquid, which includes an organic solvent and a particulate material composition including at least a resin and dissolved or dispersed in the organic solvent, from at least one nozzle to form droplets of the particulate material composition liquid in a gas phase; and
    solidifying the droplets of the particulate material composition liquid to prepare particles of the particulate material composition,
    wherein the droplet solidifying step includes:
    contacting the droplets with a poor solvent for the particulate material composition.

2. The particulate material production method according to claim 1, wherein the contacting step includes:
    collecting the droplets in a poor solvent for the particulate material composition to contact the droplet with the poor solvent.

3. The particulate material production method according to claim 1, wherein the droplet ejecting step includes:
    applying vibration to the particulate material composition liquid in a liquid column resonance chamber having at least one ejection nozzle in such a manner that a liquid column standing wave is formed in the liquid column resonance chamber, and the particulate material composition liquid is ejected as droplets from the at least one ejection nozzle, which is located in a region in which the standing wave has an antinode.

4. The particulate material production method according to claim 3, wherein the liquid column resonance chamber has plural ejection nozzles in the region in which the standing wave has an antinode.

5. The particulate material production method according to claim 1, wherein the poor solvent includes an organic solvent.

6. The particulate material production method according to claim 5, wherein the poor solvent is an organic solvent selected from n-hexane, methanol and ethanol.

7. The particulate material production method according to claim 1, wherein the poor solvent includes water.

8. The particulate material production method according to claim 7, wherein the poor solvent is water including a surfactant.

9. The particulate material production method according to claim 1, wherein the organic solvent included in the particulate material composition liquid is acetone, methyl ethyl ketone, or ethyl acetate.

10. A particulate material production apparatus comprising:

a droplet ejector to eject a particulate material composition liquid, which includes an organic solvent and a particulate material composition including at least a resin and dissolved or dispersed in the organic solvent, from at least one nozzle to form droplets of the particulate material composition liquid in a gas phase; and a poor solvent contacting device to contact the droplets with a poor solvent for the particulate material composition.

* * * * *